US012598598B2

(12) United States Patent
Abotabl et al.

(10) Patent No.: US 12,598,598 B2
(45) Date of Patent: Apr. 7, 2026

(54) SCHEDULING FOR ACTIVE BANDWIDTH PARTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Alexandros Manolakos, Escondido, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 670 days.

(21) Appl. No.: 18/007,720

(22) PCT Filed: Jul. 14, 2021

(86) PCT No.: PCT/US2021/041619
§ 371 (c)(1),
(2) Date: Dec. 1, 2022

(87) PCT Pub. No.: WO2022/015848
PCT Pub. Date: Jan. 20, 2022

(65) Prior Publication Data
US 2023/0239851 A1 Jul. 27, 2023

(30) Foreign Application Priority Data
Jul. 16, 2020 (GR) .............................. 20200100420

(51) Int. Cl.
*H04W 72/0446* (2023.01)
*H04W 72/0453* (2023.01)
(Continued)

(52) U.S. Cl.
CPC ... *H04W 72/0457* (2023.01); *H04W 72/0446* (2013.01); *H04W 72/0453* (2013.01); *H04W 72/23* (2023.01)

(58) Field of Classification Search
CPC ......... H04W 72/0446; H04W 72/0453; H04W 72/0457; H04W 72/23
See application file for complete search history.

(56) References Cited

U.S. PATENT DOCUMENTS

| | | | |
|---|---|---|---|
| 2019/0021045 A1 | 1/2019 | Kim et al. | |
| 2019/0222404 A1 | 7/2019 | Ang et al. | |

(Continued)

FOREIGN PATENT DOCUMENTS

| | | | |
|---|---|---|---|
| EP | 3573420 A1 | 11/2019 | |
| EP | 3648386 A1 | 5/2020 | |

(Continued)

OTHER PUBLICATIONS

International Search Report and Written Opinion—PCT/US2021/041619—ISA/EPO—Oct. 26, 2021.

*Primary Examiner* — Kent Krueger
(74) *Attorney, Agent, or Firm* — QUALCOMM Incorporated

(57) ABSTRACT

Aspects relate to wireless communication using multiple active bandwidth parts (BWPs). For example, a base station may configure a user equipment (UE) with two or more active BWPs. In some examples, the base station may send scheduling information to the UE on one active BWP, where the scheduling information schedules a communication on one or more active BWPs.

30 Claims, 15 Drawing Sheets

900

(51) Int. Cl.
*H04W 72/0457* (2023.01)
*H04W 72/23* (2023.01)

(56) References Cited

U.S. PATENT DOCUMENTS

| | | | | | |
|---|---|---|---|---|---|
| 2019/0253230 | A1 | 8/2019 | Loehr et al. | | |
| 2020/0037245 | A1* | 1/2020 | Lu | ......................... | H04L 5/0094 |
| 2020/0120650 | A1* | 4/2020 | Yi | ......................... | H04L 5/0055 |
| 2020/0145169 | A1* | 5/2020 | Zhou | ..................... | H04W 72/20 |
| 2020/0305184 | A1* | 9/2020 | Kim | ...................... | H04L 5/0053 |
| 2020/0351129 | A1* | 11/2020 | Kwak | ................... | H04W 76/27 |
| 2020/0367253 | A1* | 11/2020 | Kim | ...................... | H04W 80/08 |
| 2022/0014345 | A1* | 1/2022 | Abdelghaffar | ........ | H04L 5/0053 |

FOREIGN PATENT DOCUMENTS

| | | | |
|---|---|---|---|
| EP | 3662715 | A1 | 6/2020 |
| JP | 2020014082 | A | 1/2020 |
| WO | 2020067332 | A1 | 4/2020 |

* cited by examiner

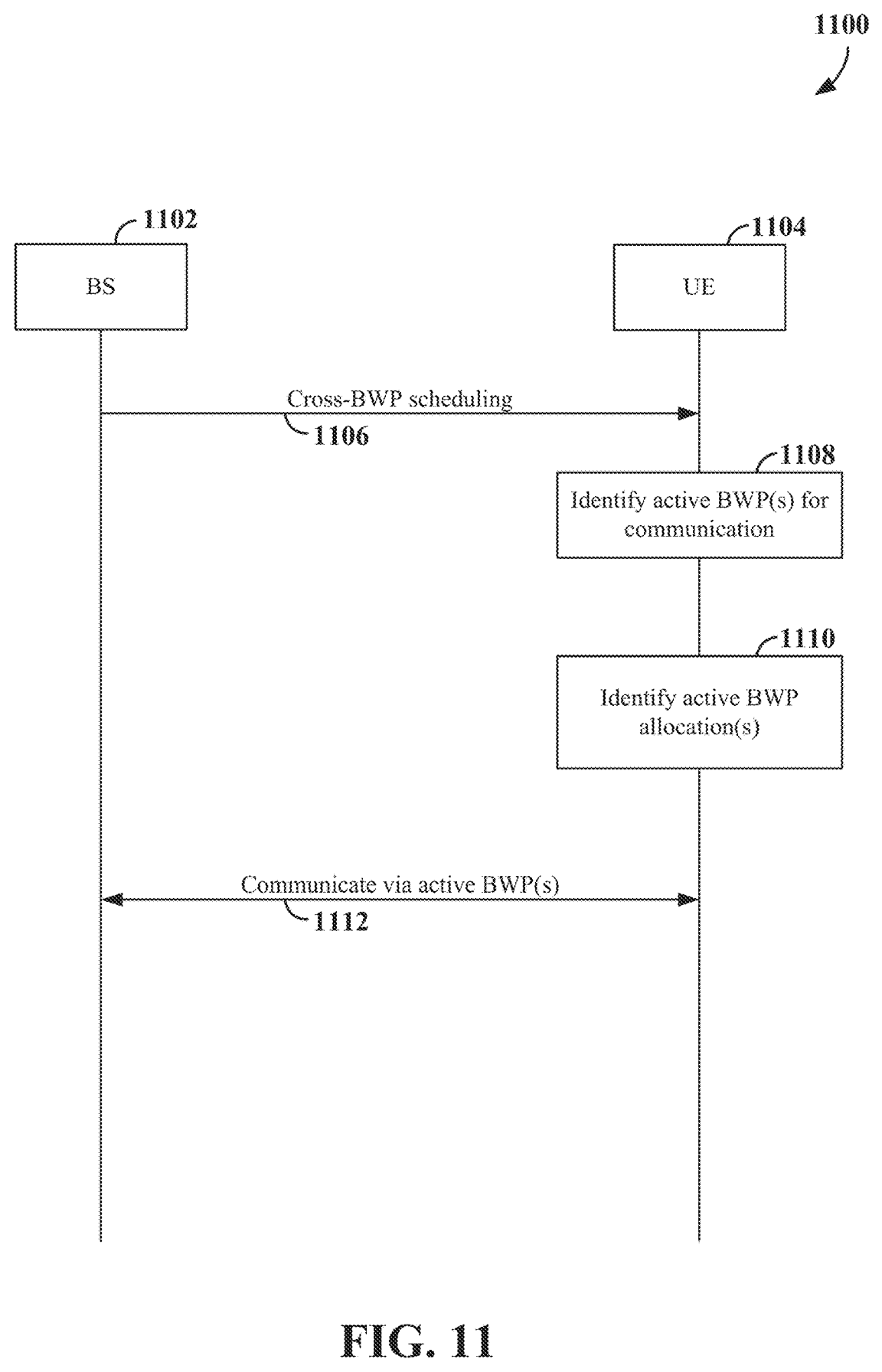

Cross-BWP scheduling
1106

1108

Identify active BWP(s) for
communication

1110

Identify active BWP
allocation(s)

Communicate via active BWP(s)
1112

FIG. 11

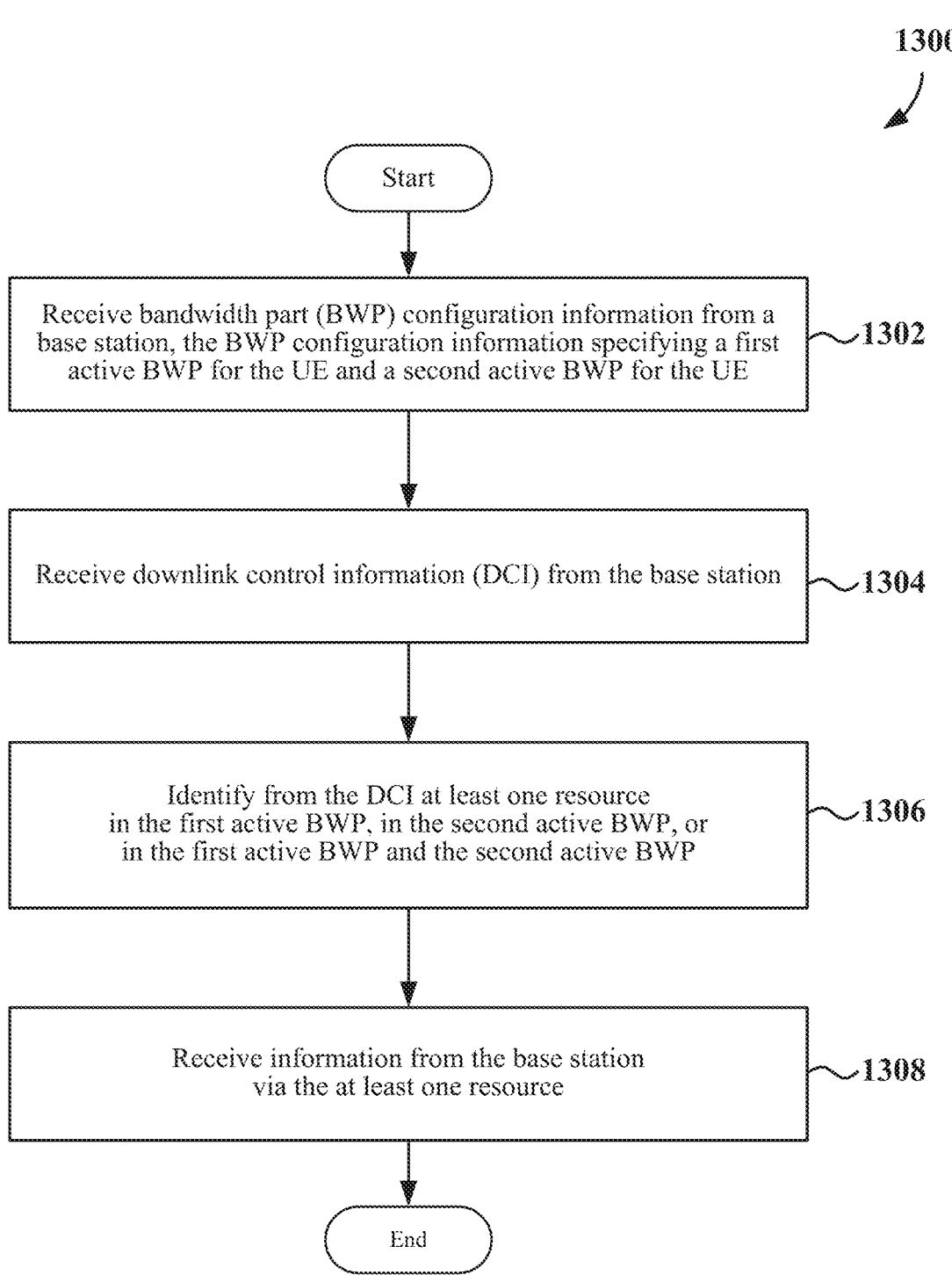

1300

Start

Receive bandwidth part (BWP) configuration information from a base station, the BWP configuration information specifying a first active BWP for the UE and a second active BWP for the UE ⟋1302

Receive downlink control information (DCI) from the base station ⟋1304

Identify from the DCI at least one resource in the first active BWP, in the second active BWP, or in the first active BWP and the second active BWP ⟋1306

Receive information from the base station via the at least one resource ⟋1308

End

FIG. 13

SCHEDULING FOR ACTIVE BANDWIDTH PARTS

CROSS-REFERENCE TO RELATED APPLICATIONS

This application for patent is a U.S. National Stage entry of International Patent Application No. PCT/US2021/041619 filed 14 Jul. 2021, which claims priority to and the benefit of Greece patent application Ser. No. 20200100420, titled "SCHEDULING FOR ACTIVE BANDWIDTH PARTS" filed Jul. 16, 2020, and assigned to the assignee hereof and hereby expressly incorporated by reference herein as if fully set forth below in its entirety and for all applicable purposes.

TECHNICAL FIELD

The technology discussed below relates generally to wireless communication networks and, more particularly, to sending scheduling information on one active bandwidth part where the scheduling information schedules a communication on one or more active bandwidth parts.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The base station and the UE can select at least one beam pair link (BPL) for communication between the base station and the UE on a downlink and/or an uplink. Each BPL includes corresponding transmit and receive beams on the base station and the UE. For example, on the downlink, a BPL includes a transmit beam on the base station and a receive beam on the UE. To increase the data rate, multiple BPLs can be used to facilitate spatial multiplexing of multiple data streams from the base station to the UE.

To reduce latency and enhance the spectrum efficiency in a cell, full-duplex (FD) communication may be used in 5G systems. In some examples, FD allows simultaneous two-way communication by using spatial multiplexing. In the case of FD using spatial multiplexing, different antenna arrays (e.g., different antenna panels) and beams are operable at the same time but still can achieve FD simultaneous communication through spatial separation (e.g., such as through beam direction). The downlink and uplink frequency bands in FD communication may be fully overlapped, partially overlapped or separated with a guard band in between.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving bandwidth part configuration information from a base station. The bandwidth part configuration information may specify a first active bandwidth part for the user equipment and a second active bandwidth part for the user equipment. The method may also include receiving downlink control information from the base station and identifying from the downlink control information at least one resource in the first active bandwidth part, in the second active bandwidth part, or in the first active bandwidth part and the second active bandwidth part. The method may further include receiving information from the base station via the at least one resource.

In some examples, a user equipment may include a transceiver, a memory, and a processor communicatively coupled to the transceiver and the memory. The processor and the memory may be configured to receive bandwidth part configuration information from a base station via the transceiver. The bandwidth part configuration information may specify a first active bandwidth part for the user equipment and a second active bandwidth part for the user equipment. The processor and the memory may also be configured to receive downlink control information from the base station via the transceiver and identify from the downlink control information at least one resource in the first active bandwidth part, in the second active bandwidth part, or in the first active bandwidth part and the second active bandwidth part. The processor and the memory may further be configured to receive via the transceiver information from the base station via the at least one resource.

In some examples, a user equipment may include means for receiving bandwidth part configuration information from a base station. The bandwidth part configuration information may specify a first active bandwidth part for the user equipment and a second active bandwidth part for the user equipment. The user equipment may also include means for receiving downlink control information from the base station and means for identifying from the downlink control information at least one resource in the first active bandwidth part, in the second active bandwidth part, or in the first active bandwidth part and the second active bandwidth part. The user equipment may further include means for receiving information from the base station via the at least one resource.

In some examples, an article of manufacture for use by a user equipment includes a non-transitory computer-readable medium having stored therein instructions executable by one or more processors of the user equipment to receive bandwidth part configuration information from a base station. The bandwidth part configuration information may specify a first active bandwidth part for the user equipment and a second active bandwidth part for the user equipment. The computer-readable medium may also have stored therein instructions executable by one or more processors of the user equipment to receive downlink control information from the base station and identify from the downlink control information at least one resource in the first active bandwidth part, in the second active bandwidth part, or in the first active bandwidth part and the second active bandwidth part. The computer-readable medium may further have stored therein instructions executable by one or more processors of the user equipment to receive information from the base station via the at least one resource.

The downlink control information may indicate that the first active bandwidth part is a main active bandwidth part. The downlink control information may indicate a frequency domain resource allocation, a time domain resource allocation for the first active bandwidth part and the second active bandwidth part, a first time domain resource allocation for the first active bandwidth part and a second time domain resource allocation for the second active bandwidth part, a first time domain resource allocation for the first active bandwidth part and an index offset, a first time domain resource allocation for the first active bandwidth part and a time offset, a first frequency domain resource allocation for the first active bandwidth part and a second frequency domain resource allocation for the second active bandwidth part, or any combination thereof. The downlink control information may include a cross-bandwidth part scheduling indication. The above features may also include determining whether the at least one resource includes a first resource in the second active bandwidth part, determining whether a first bandwidth specified by the frequency domain resource allocation is greater than a second bandwidth of the first active bandwidth part, determining whether the at least one resource includes a first resource in the second active bandwidth part is based on the indication, determining a resource block group size based on a sum of a first bandwidth of the first active bandwidth part and a second bandwidth of the second active bandwidth part, calculating a quantity of bits for the bitmap based on the resource block group size, or any combination thereof.

In some examples, a method for wireless communication at a base station is disclosed. The method may include generating bandwidth part configuration information specifying a first active bandwidth part and a second active bandwidth part, transmitting the bandwidth part configuration information to a user equipment, and transmitting downlink control information to the user equipment. The downlink control information may identify at least one resource in the first active bandwidth part, in the second active bandwidth part, or in the first active bandwidth part and the second active bandwidth part. The method may also include transmitting information to the user equipment via the at least one resource.

In some examples, a base station may include a transceiver, a memory, and a processor communicatively coupled to the transceiver and the memory. The processor and the memory may be configured to generate bandwidth part configuration information specifying a first active bandwidth part and a second active bandwidth part, transmit the bandwidth part configuration information to a user equipment, and transmit downlink control information to the user equipment via the transceiver. The downlink control information may identify at least one resource in the first active bandwidth part, in the second active bandwidth part, or in the first active bandwidth part and the second active bandwidth part. The processor and the memory may also be configured to transmit via the transceiver information to the user equipment via the at least one resource.

In some examples, a base station may include means for generating bandwidth part configuration information specifying a first active bandwidth part and a second active bandwidth part, means for transmitting the bandwidth part configuration information to a user equipment, and means for transmitting downlink control information to the user equipment. The downlink control information may identify at least one resource in the first active bandwidth part, in the second active bandwidth part, or in the first active bandwidth part and the second active bandwidth part. The base station may also include means for transmitting information to the user equipment via the at least one resource.

In some examples, an article of manufacture for use by a base station includes a non-transitory computer-readable medium having stored therein instructions executable by one or more processors of the base station to generate bandwidth part configuration information specifying a first active bandwidth part and a second active bandwidth part, transmit the bandwidth part configuration information to a user equipment, and transmit downlink control information to the user equipment. The downlink control information may identify at least one resource in the first active bandwidth part, in the second active bandwidth part, or in the first active bandwidth part and the second active bandwidth part. The computer-readable medium may also have stored therein instructions executable by one or more processors of the user equipment to transmit information to the user equipment via the at least one resource.

The downlink control information may indicate that the first active bandwidth part is a main active bandwidth part. The downlink control information may indicate a frequency domain resource allocation, a time domain resource allocation for the first active bandwidth part and the second active bandwidth part, a first time domain resource allocation for the first active bandwidth part and a second time domain resource allocation for the second active bandwidth part, a first time domain resource allocation for the first active bandwidth part and an index offset, a first time domain resource allocation for the first active bandwidth part and a time offset, a first frequency domain resource allocation for the first active bandwidth part and a second frequency domain resource allocation for the second active bandwidth part, or any combination thereof. The downlink control information may include a cross-bandwidth part scheduling indication. The above features may also include determining a resource block group size based on a sum of a first bandwidth of the first active bandwidth part and a second bandwidth of the second active bandwidth part, calculating a quantity of bits for the bitmap based on the resource block group size, or any combination thereof.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 5A is a tabular depiction of a plurality of new radio (NR) operating bands (e.g., radio channels), uplink operating band frequencies, downlink operating band frequencies, and the duplex mode associated with each of the NR operating bands according to some aspects.

FIG. 5B is a diagram illustrating a frequency division duplex (FDD) FD modulation scheme according to some aspects.

FIG. 5C is a diagram illustrating a time division duplex (TDD) HD modulation scheme according to some aspects.

FIG. 5D is a diagram illustrating a TDD FD modulation scheme according to some aspects.

FIG. 7A is a schematic diagram depicting an antenna array according to some aspects.

FIG. 7B is a diagram depicting the transmission or reception configuration of two panels.

FIG. 11 is a signaling diagram illustrating an example of bandwidth part-related signaling between a user equipment and a base station according to some aspects.

FIG. 13 is a flow chart of an example method for bandwidth part scheduling according to some aspects.

DETAILED DESCRIPTION

Figure 1:
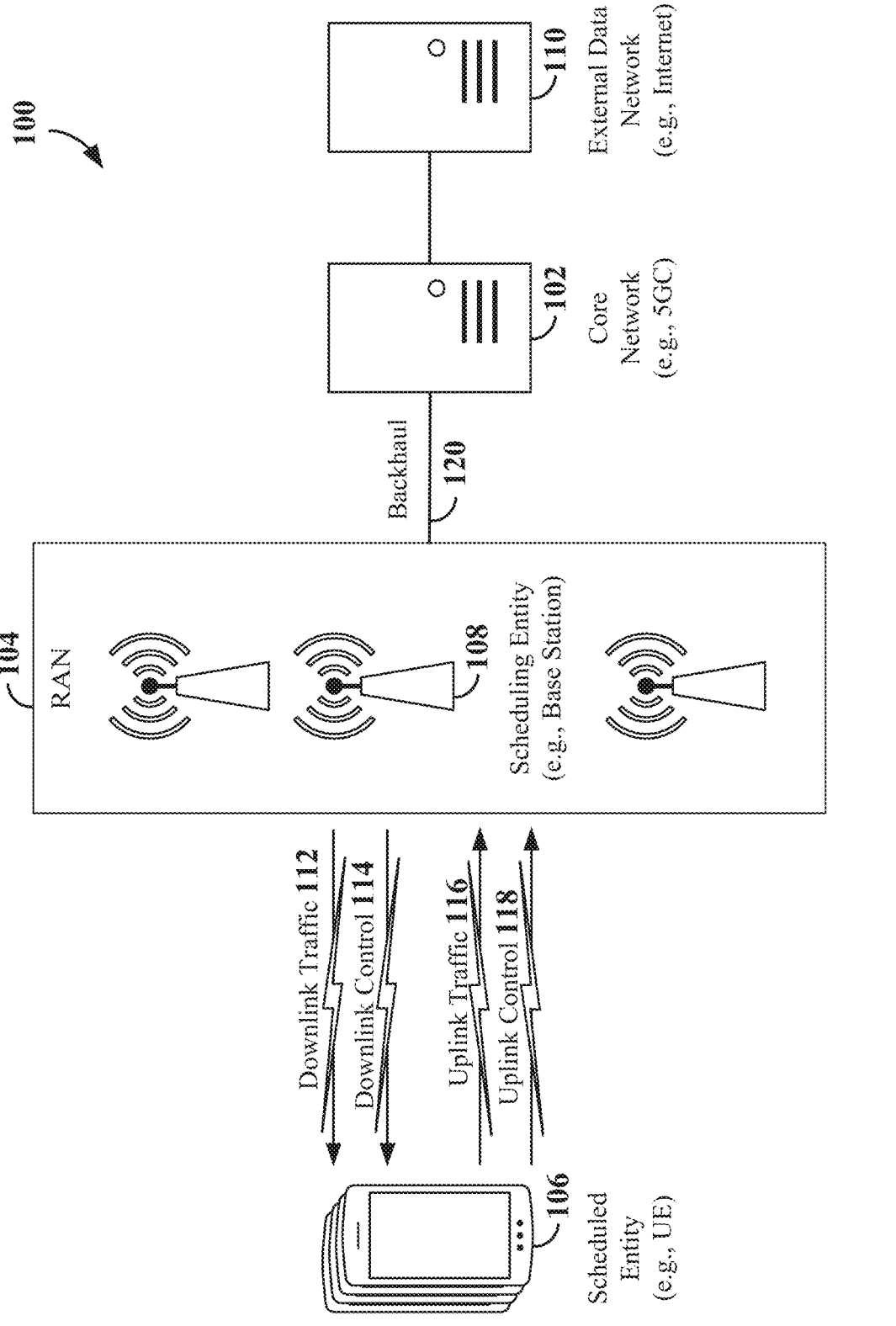
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The disclosure relates in some aspects to wireless communication using multiple active bandwidth parts (BWPs). For example, a base station may configure a user equipment (UE) with two or more active BWPs. The UE may then use multiple active BWPs for full-duplex communication and/or to improve the switching time from one active bandwidth part (BWP) to another.

The disclosure relates in some aspects to sending scheduling information on one active BWP where the scheduling information schedules a communication on one or more active BWPs. In some examples, a base station may send an indication to a UE that specifies whether a scheduled physical downlink shared channel (PDSCH) is carried in one active BWP or two active BWPs. In some examples, a base station may send an indication to a UE that specifies at least one time domain resource allocation (TDRA) for one or more active BWPs. In some examples, a base station may send an indication to a UE that specifies at least one frequency domain resource allocation (FDRA) for one or more active BWPs.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays. RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
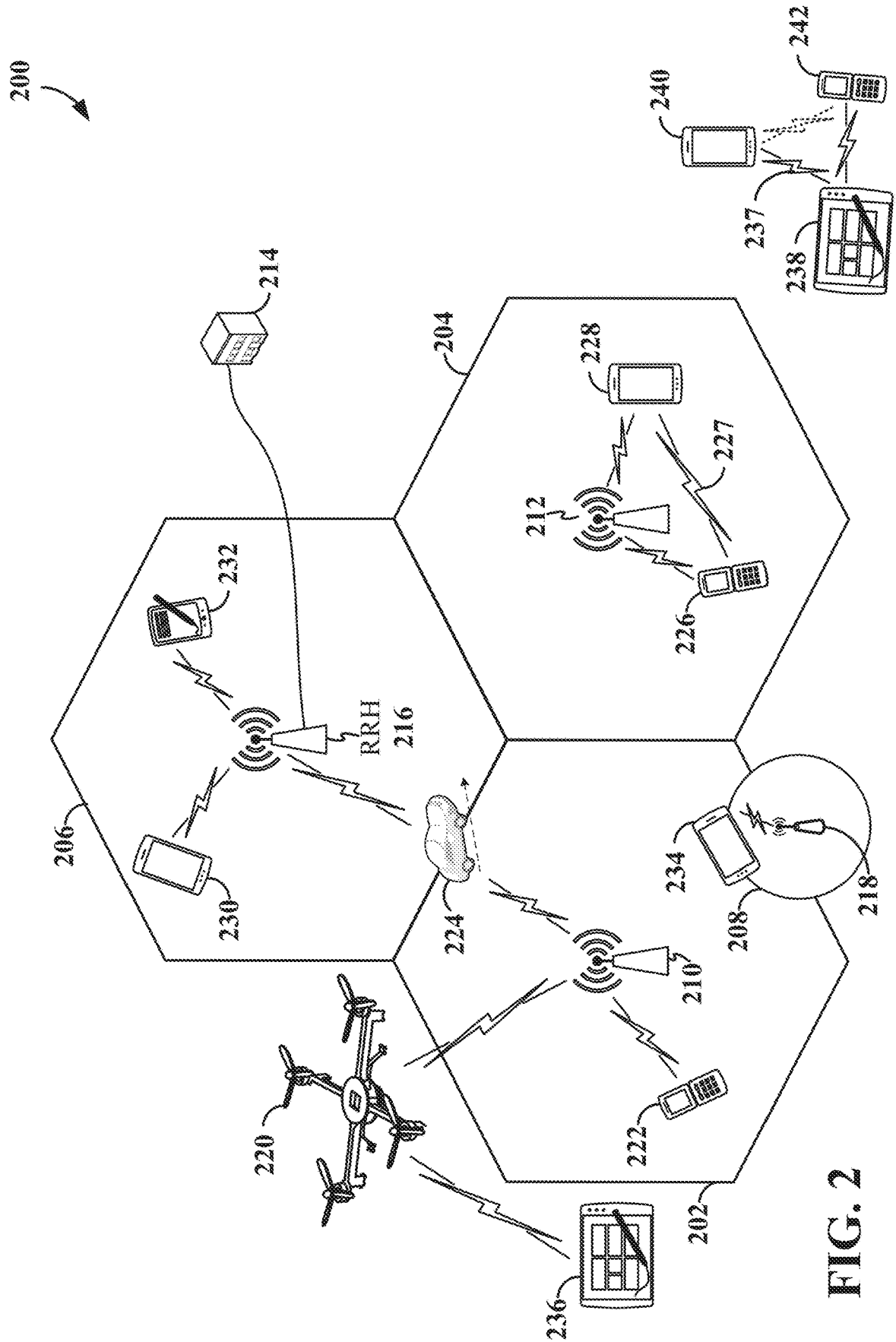
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, LUEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
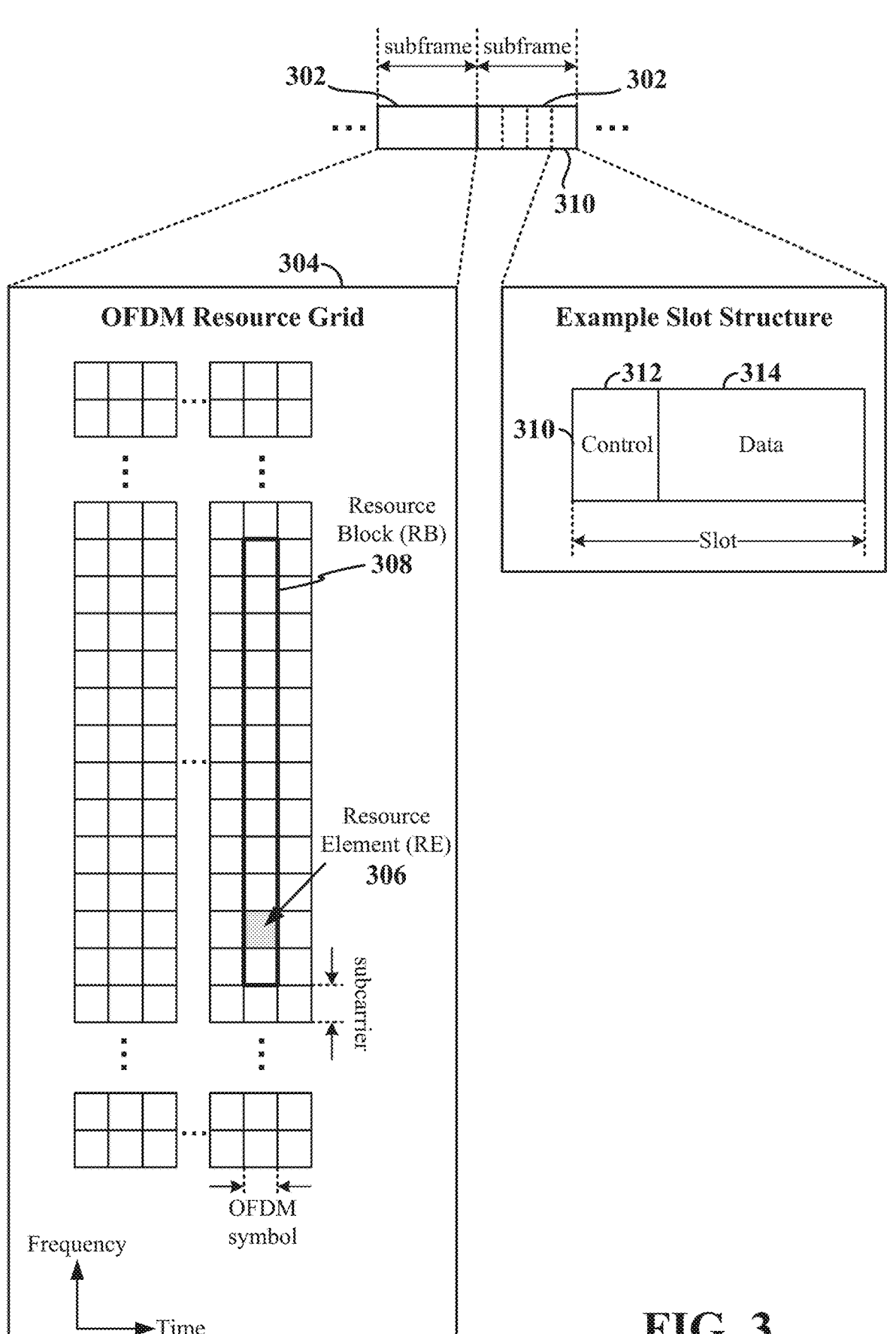
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4A:
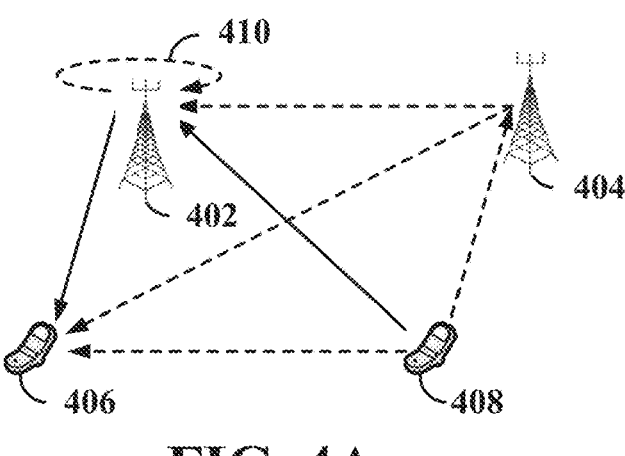
FIG. 4A is a schematic illustration of a wireless communication network and sources of interference for a transmission from a full-duplex (FD) gNB to a half-duplex (HD) user equipment (UE) according to some aspects.
Figure 4B:
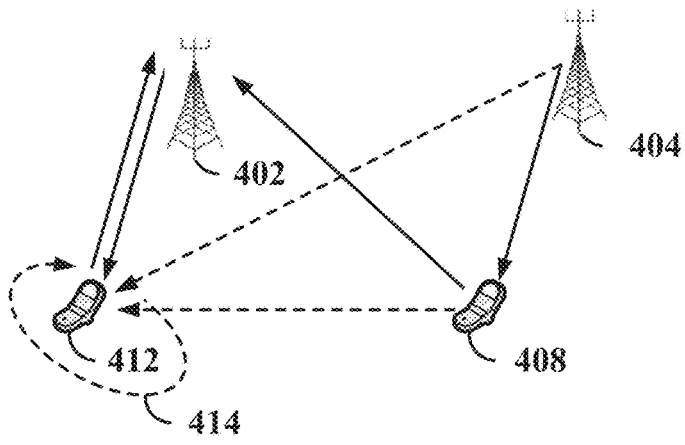
FIG. 4B is a schematic illustration of a wireless communication network and sources of interference for a transmission from an FD gNB to an FD UE according to some aspects.
Figure 4C:
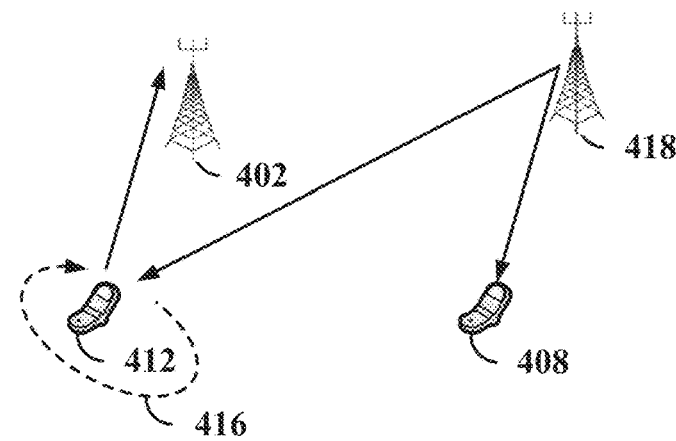
FIG. 4C is a schematic illustration of a wireless communication network and sources of interference for a transmission from an FD UE to an FD gNB according to some aspects.

As mentioned above, a UE and a base station (e.g., gNB) may use full-duplex communication. FIGS. 4A, 4B, and 4C illustrate wireless communication systems including a full-duplex gNB 402, a neighbor gNB 404, a half-duplex UE 406, a first full-duplex UE 412, a second full-duplex UE 408. These figures further illustrate different sources of interference (e.g., cross-beam interference) for the half-duplex UE 406, the first full-duplex UE 412, the second full-duplex UE 408, and different gNB configurations according to some aspects of the disclosure. The half-duplex UE 406, the first full-duplex UE 412, and the second full-duplex UE 408 may correspond to any of the UEs or scheduled entities shown in any of FIGS. 1, 2, 11, and 12.

In FIG. 4A, a full-duplex gNB 402 (e.g., a scheduling entity) is transmitting to the half-duplex UE 406. During the time of the transmission from the full-duplex gNB 402 to the half-duplex UE 406, the full-duplex gNB 402 is receiving, at its receiver (not shown), self-interference 410 from its own transmission to the half-duplex UE 406 as well as interference from the neighbor gNB 404 and an uplink transmission from a second full-duplex UE 408. The half-duplex UE 406 is also receiving interference from the second full-duplex UE 408 and the neighbor gNB 404. Because it is a half-duplex UE, the half-duplex UE 406 is not transmitting during the time of the transmission from the full-duplex gNB 402 to the half-duplex UE 406, and therefore, the half-duplex UE 406 receives no self-interference. The full-duplex gNB 402 and the neighbor gNB 404 may each correspond to any of the base stations or scheduling entities shown in any of FIGS. 1, 2, 7A, 11, and 14.

In FIG. 4B, the full-duplex gNB 402 is transmitting a downlink transmission to the first full-duplex UE 412. During the time of the transmission of the downlink transmission from the full-duplex gNB 402 to the first full-duplex UE 412, the full-duplex gNB 402 is receiving, at its receiver (not shown), a simultaneous uplink transmission from the first full-duplex UE 412. At the same time as the just mentioned simultaneous downlink and uplink transmissions, the first full-duplex UE 412 is receiving, at its receiver (not shown), self-interference 414 from its own transmission to the full-duplex gNB 402 as well as interference from the neighbor gNB 404 and interference from the second full-duplex UE 408.

FIG. 4C illustrates a full-duplex gNB configured as a multi-TRP base station including a first TRP 402a and a second TRP 402b. The first TRP 402a is receiving an uplink transmission from the first full-duplex UE 412. During the time of the transmission of the uplink transmission to the first TRP 402a, the first full-duplex UE 412 is also receiving a transmission from the second TRP 402b. In addition to the transmission received from the second TRP 418b, the first full-duplex UE 412 is also receiving, at its receiver (not shown), self-interference 416 from its own transmission to the first TRP 402a.

Conventionally, different frequency bands may be allocated for allocated for the transmissions of FIGS. 4A-4B to mitigate the above interference. For the half-duplex UE 406 of FIG. 4A, interference may be mitigated if the interference from the neighbor gNB 404 and second full-duplex UE 408 are at frequencies other than those occupied by the downlink transmission from the full-duplex gNB 402 to the half-duplex UE 406. Similarly, for the first full-duplex UE 412 of FIGS. 4B and 4C, interference may be mitigated if the self-interference 416 from the first full-duplex UE 412, interference from the neighbor gNB 404, and/or interference from the second full-duplex UE 408 are at frequencies other than those occupied by the downlink transmission from the full-duplex gNB 402 to the half-duplex UE 406.

Figures 5A, 5B, 5C, 5D:
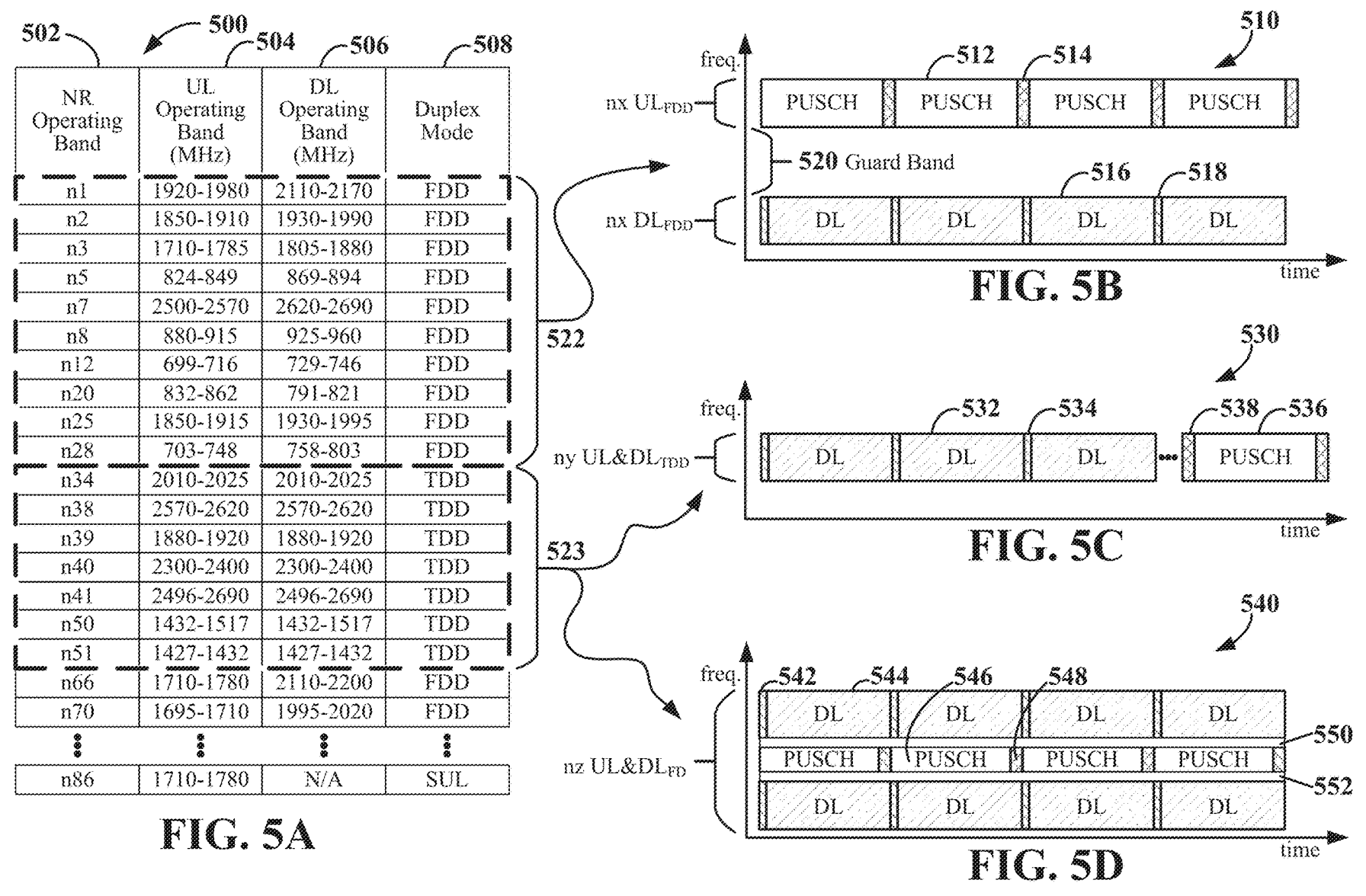

FIG. 5A is a tabular depiction 500 of a plurality of new radio (NR) operating bands 502 (e.g., radio channels). UL operating band frequencies 504, DL operating band frequencies 506, and duplex modes 508 associated with each of the NR operating bands 502 according to some aspects of the disclosure.

FIG. 5B is a diagram illustrating an FDD FD modulation scheme 510 according to some aspects of the disclosure. In the example shown in FIG. 5B, time is illustrated along the horizontal axis while frequency is illustrated along the vertical axis. A plurality of physical uplink shared channels (PUSCHs) 512 and uplink control channels 514 are depicted as occupying the UL operating band identified as nx $UL_{FDD}$. A plurality of downlink data channels 516 (e.g., physical downlink shared channels (PDSCHs)) and downlink control channels 518 are depicted as occupying the DL operating band identified as nx $DL_{FDD}$. The UL operating band, nx $UL_{FDD}$, and the DL operating band, nx $DL_{FDD}$, are depicted as being separated in frequency by a guard band 520. The paired use of the nx $UL_{FDD}$ uplink operating band and the nx $DL_{FDD}$ operating band of a given, nx operation band may be referred to as paired spectrum. The nomenclature "nx" represents any one of the NR operating bands 502 designated for FDD mode in the duplex modes 508. A sub-group 522 of all NR operating bands 502 designated for FDD mode in the duplex modes 508 is denoted in FIG. 5A. The operating bands are examples and non-limiting.

FIG. 5C is a diagram illustrating a TDD HD modulation scheme 530 according to some aspects of the disclosure. In the example shown in FIG. 5C, time is illustrated along the horizontal axis while frequency is illustrated along the vertical axis. A plurality of downlink data channels 532 and downlink control channels 534 are depicted as occupying the operating band identified as ny $UL\&DL_{TDD}$. The single operating band, ny $UL\&DL_{TDD}$, is utilized for uplink and downlink by separating the UL and DL information in time (e.g., they do not occupy the same time slots simultaneously). The unpaired use of the nx $UL_{FDD}$ uplink operating band and the nx DLFDD operating band (both at a same frequency, or a same frequency band, of a given, nx operation band may be referred to as unpaired spectrum. A physical uplink shared channel (PUSCH) 536 and uplink control channel 538 are depicted as occupying the single operating band, ny $UL\&DL_{TDD}$. The nomenclature "ny" represents any one of the NR operating bands 502 designated for TDD mode in the duplex modes 508. A sub-group 523 of all NR operating bands 502 designated for TDD mode in the duplex modes 508 is denoted in FIG. 5A. The operating bands are examples and non-limiting.

Figures 6A, 6B:
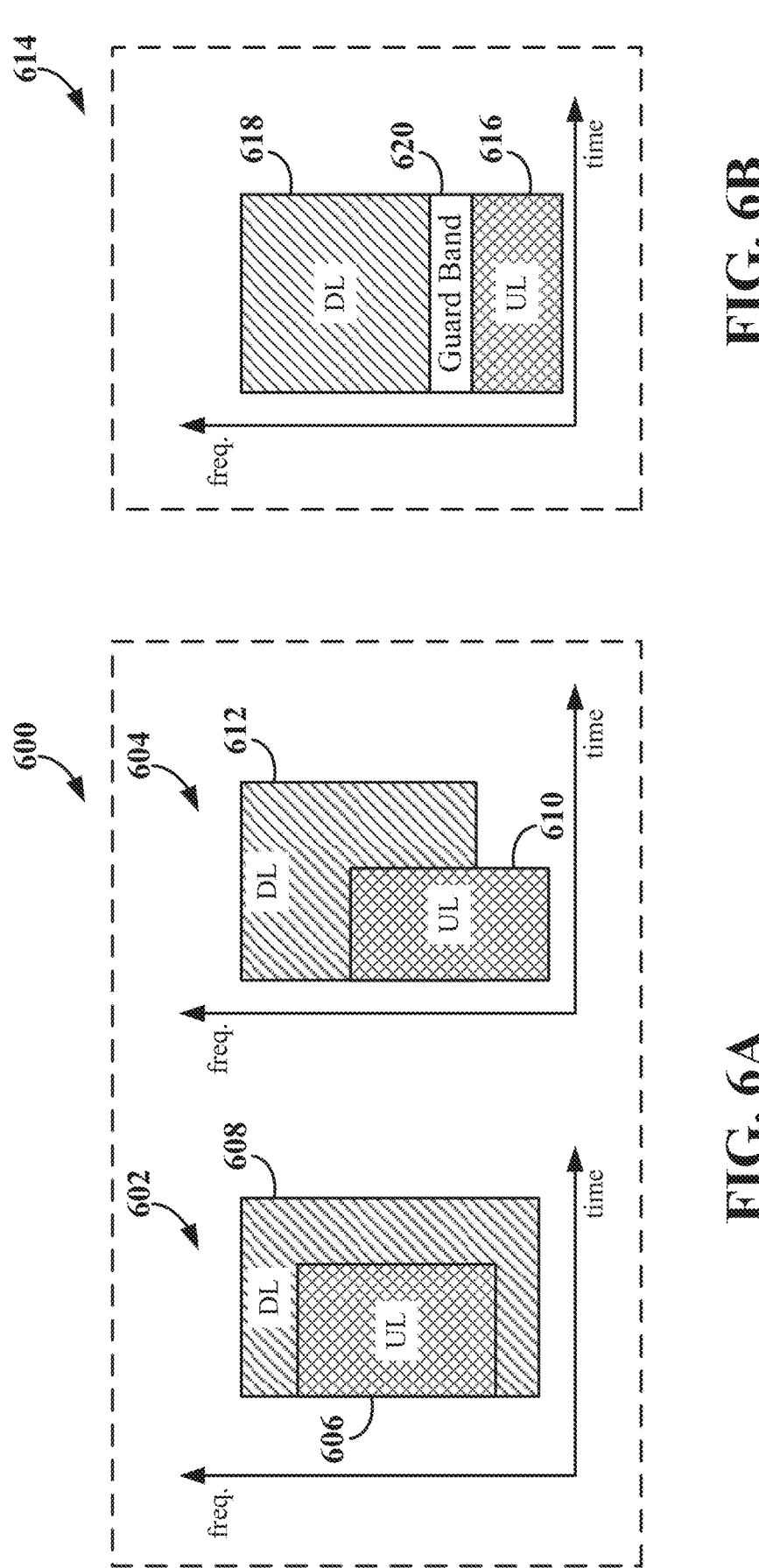
FIG. 6A is a diagram illustrating two examples of inter-band full-duplex (IBFD) according to some aspects.
FIG. 6B is a diagram illustrating an example of sub-band FDD (also known as flexible duplex) according to some aspects.

FIG. 5D is a diagram illustrating an example of a TDD FD modulation scheme 540 according to some aspects of the disclosure. In the example shown in FIG. 5D, time is illustrated along the horizontal axis while frequency is illustrated along the vertical axis. As illustrated in the example diagram of FIG. 5D, a full-duplex network may utilize sub-band FDD (e.g., as illustrated in FIG. 6B) in unpaired spectrum, in which transmissions in different directions are carried in different sub-bands or BWPs of the same carrier bandwidth. A plurality of downlink data channels 544 and downlink control channels 542 and a plurality of PUSCHs 546 and uplink control channels 548 are all depicted as occupying the operating band identified as nz UL&DL$_{FD}$. The single operating band, nz UL&DL$_{FD}$, is utilized for uplink and downlink without separating the UL and DL information in time (e.g., they do occupy the same time slots simultaneously). The nomenclature "nz" represents any one of the NR operating bands 502 designated for TDD mode in the duplex modes 508. A sub-group 523 of all NR operating bands 502 designated for TDD mode in the duplex modes 508 is denoted in FIG. 5A. A first guard band 550 and a second guard band 552 are depicted in FIG. 5D. The first guard band 550 and the second guard band 552 may be the same bandwidth or different bandwidths. Either or both of the first guard band 550 and the second guard band 552 may be zero bandwidth guard bands. The first guard band 550 and the second guard band 552 (individually or collectively) in the unpaired spectrum may be smaller than the guard band 520 in the paired spectrum.

Various examples of TDD FD operation are illustrated in FIGS. 6A and 6B. FIG. 6A is a diagram illustrating two examples of inter-band full-duplex (IBFD) modulation 600 according to some aspects of the disclosure. In the examples shown in FIG. 6A, time is illustrated along the horizontal axis while frequency is illustrated along the vertical axis. A first example 602 of IBFD is depicted on the left while a second example 604 is depicted on the right. In the first example 602, the UL time-frequency resources 606 completely overlap with a portion of the DL time-frequency resources 608. In the second example 604, the UL time-frequency resources 610 partially overlap with a portion of the DL time-frequency resources 612. Accordingly, a device, for example a base station and/or a scheduled entity, employing IBFD may transmit and receive on the same time and frequency resources. That is, the device may transmit and receive at the same time(s) at the same frequency (or frequencies). The UL and DL share the same time and frequency resources. The overlap in time-frequency resources may be complete (full overlap), as in the first example 602, or partial, as in the second example 604.

FIG. 6B is a diagram illustrating an example of sub-band FDD 614 (e.g., xDD) according to some aspects of the disclosure. In the example shown in FIG. 6B, time is illustrated along the horizontal axis while frequency is illustrated along the vertical axis. In sub-band FDD 614, a device may transmit and receive at the same time but on different frequency resources (e.g., within the same carrier bandwidth). In some examples, the different frequency resources may be in unpaired spectrum. The UL resources 616 are separated from the DL resources 618 by a guard band 620. In some scenarios, the guard band 620 may be relatively narrow (e.g., a few RBs). Consequently, a transmission in the UL resources 616 may result in leakage in the DL resources 618, and vice versa.

Figures 7A, 7B:
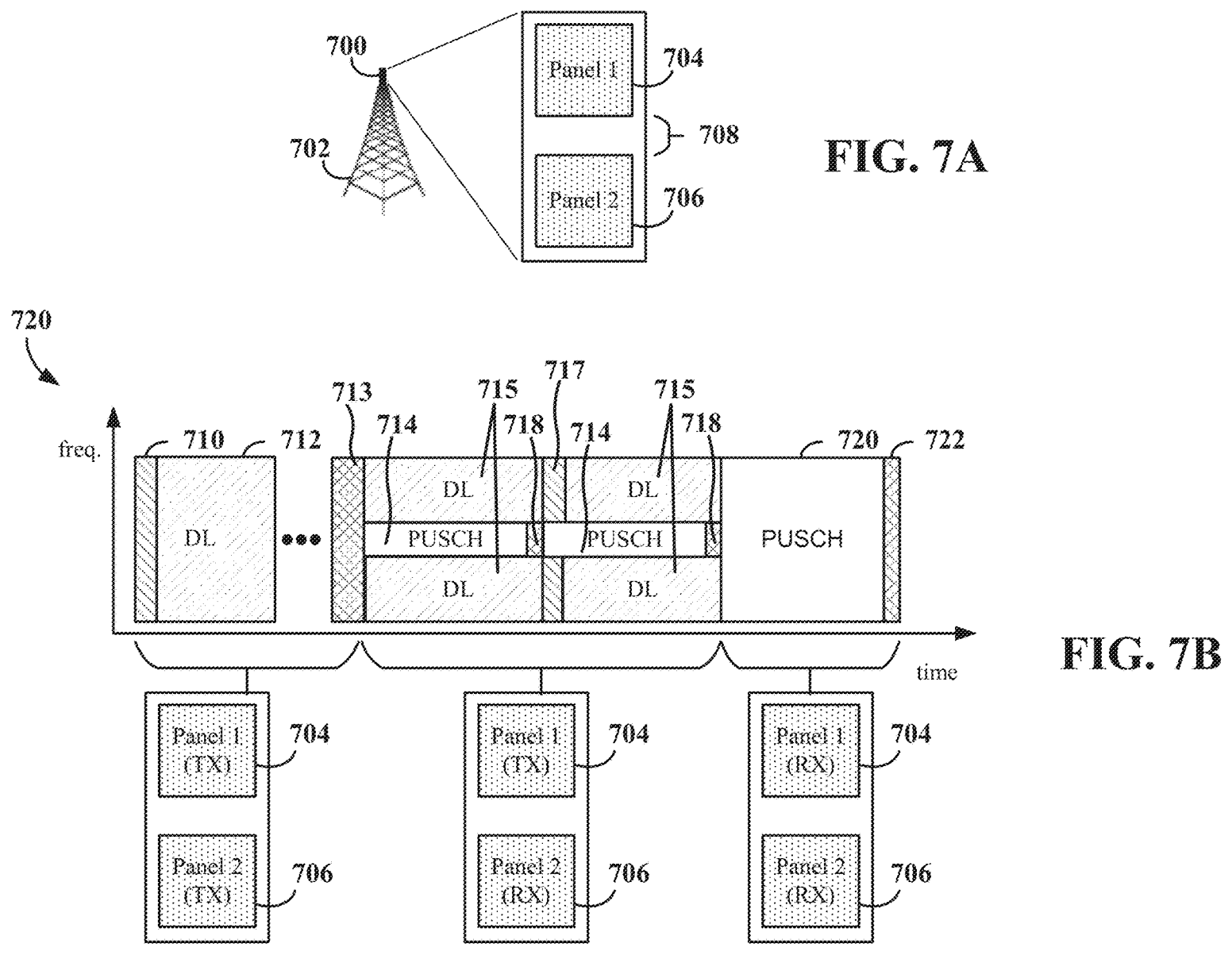

FIGS. 7A and 7B illustrate that a wireless communication device (e.g., a base station, a UE, etc.) may use multiple antenna panels to support full-duplex communication. FIG. 7A is a schematic diagram depicting an antenna array 700 of a TRP atop a base station 702 according to some aspects of the disclosure. The antenna array 700 is divided into two panels (panel 1 704, panel 2 706) with a physical separation 708 therebetween. Each of the two panels may be a subarray of antennas. A given panel may transmit and/or receive a beam or a beam group. A different number of panels may be used in other examples.

Other types of devices may include multi-panel antenna arrays for full-duplex communication. For example, a UE may have a first panel on one side of the UE and a second panel on an opposite side of the UE. As another example, a UE may have four panels, with one panel on each corner of the UE.

FIG. 7B is a diagram depicting the transmission or reception configuration of the two panels (panel 1 704 and panel 2 706 of FIG. 7A or two panels on a UE, etc.). The transmission (TX) and reception (RX) configurations of the two panels are depicted for various DL and UL channels as may be implemented in a device (e.g., a scheduling entity or a scheduled entity) implementing flexible TDD according to some aspects of the disclosure.

As mentioned above, flexible TDD may involve in some examples using two panels to operate in either a TDD mode (with both panels on the gNB and one or more panels on the UE configured for either DL or UL) or an SBFD mode (with one panel on each of the gNB and UE configured for UL and another panel on each of the gNB and UE configured for DL) as described below with reference to FIG. 7B.

At the left of FIG. 7B, when the antenna array 700 is communicating in only a single direction at a time, both panel 1 704 and panel 2 706 may be configured for the single-direction communication as an example of a TDD mode showing the DL transmission. For example, both panels 704 and 706 may be configured to transmit DL control 710, DL data 712, and DL data 713 as an example of DL transmissions during TDD mode. At the center of FIG. 7B, when the antenna array 700 is simultaneously transmitting a combination of DL data 715 and DL control 717 and receiving UL data (e.g., PUSCH 714) and UL control 718, panel 1 704 may be configured for DL transmission (i.e., TX) and panel 2 706 may be configured for UL reception (i.e., RX). At the right of FIG. 7B, when the antenna array 700 is only receiving UL data (e.g., PUSCH 720) and UL control 722, both panel 1 704 and panel 2 706 may be configured for UL reception. The antenna array 700 is thus configurable for both TDD and full-duplex operation (e.g., flexible TDD). The physical separation 708 between panel 1 704 and panel 2 706 may provide improved isolation between the panels (e.g., greater than about 50 dB of improved isolation) when compared to two panels without the physical separation 708. The above discussion also may be applicable to an antenna array in another type of device (e.g., a UE, with the references to DL and UL reversed).

Conventionally, the network may configure up to four BWPs for the DL and up to four BWPs for the UL for a UE. The UE may then use one of these configured BWPs as an active BWP for communication. A BWP may specify the set of useful frequencies for a UE (e.g., a frequency range within an allocated frequency band that the UE is to monitor for DL transmissions). Typically, a BWP is contiguous in frequency.

Conventionally, the amount of time it takes to switch from operating in one active BWP to activating another BWP and then operating in the newly activated BWP (BWP switching time) may be relatively long as indicated in Table 1 below. In Table 1. Type 1 is for so-called fast switching and Type 2 is for so-called slow switching.

TABLE 1

| BWP Switch Delay | | | |
|---|---|---|---|
| NR Slot Length | | BWP Switch delay $T_{BWPswitchDelay}$ (Slots) | |
| μ | (ms) | Type $1^{Note\ 1}$ | Type $2^{Note\ 1}$ |
| 0 | 1 | 1 | 3 |
| 1 | 0.5 | 2 | 5 |
| 2 | 0.25 | 3 | 9 |
| 3 | 0.125 | 6 | 18 |

$^{Note\ 1}$Depends on UE capability

Note 2:

If the BWP switch involves changing of the subcarrier spacing (SCS), the BWP switch delay is determined by the larger one between the SCS before BWP switch and the SCS after BWP switch.

A UE may be configured to switch from one BWP to another BWP in different ways. In some scenarios, a base station may send a DCI that includes a BWP indicator that specifies the BWP that the UE is to use. In some scenarios (e.g., for a DL BWP), a UE may switch to a default BWP upon expiration of a timer (e.g., a Bwp-InactivityTimer: ServingCellConfig.bwp-InactivityTimer). In some scenarios, a base station may send radio resource control (RRC) signaling that specifies the BWP that the UE is to use.

In some scenarios, a MAC entity at the UE may initiate a BWP switch. For example, during a random access channel (RACH) procedure, if the current active BWP is not configured for RACH, the UE may switch to a default BWP to find RACH configurations. For example, upon initiation of a RACH procedure, if physical random access channel (PRACH) occasions are not configured for the active UL BWP, the MAC layer may switch the active UL BWP to an initial uplink BWP. In contrast, if PRACH occasions are configured for the active UL BWP, the UE will not need to switch the active UL BWP. For the DL, in some examples, a BWP switch may occur if the serving cell is the SpCell and if the bwp-id of the active DL BWP is different from the bwp-id of the active UL BWP. An SpCell refers to either a primary cell (PCell) (e.g., a Pcell of an MCG) or a primary secondary cell (PSCell) (e.g., of an SCG).

The manner in which a BWP switch occurs may depend on the duplexing method in use. In TDD, a DL and UL BWP switch may occur simultaneously. In FDD, a DL BWP and an UL BWP may switch independently of one another.

A frequency allocation for a BWP may be specified by a frequency domain resource allocation (FDRA) signaled in a DCI. The are two standard types of FDRA: Type 0 and Type 1.

In Type 0 FDRA, the frequency allocation is specified by a bitmap. In some examples, the size of the bitmap is either 18 bits or 9 bits. This scheme allows a disjoint RB allocation. In some examples, the allocation is in multiples of RBs (e.g., an RB group (RBG)). A bit in the bitmap may correspond to one RBG in some examples. The RBG size depends on the BWP size and the configuration type as shown in Table 2. For example, a parameter rbg-Size [ENUMERATED {config1, config2}] may specify the RBG sizes for the different configurations.

TABLE 2

| Bandwidth Part Size | Configuration 1 | Configuration 2 |
|---|---|---|
| 1-36 | 2 | 3 |
| 37-72 | 4 | 8 |
| 73-144 | 8 | 16 |
| 145-275 | 16 | 16 |

In Type 1 FDRA, the frequency allocation is specified by a start and a length (e.g., a start and length indicator value (SLIV)). Consequently. FDRA Type 1 is a consecutive RB allocation. In some examples, the frequency allocation is determined by a resource block start (RB_start) and the number of consecutive RBs which are combined in a Resource Indicator Value (RIV) field. Equation 1 illustrates an example of a formula for an RIV.

$$\text{if } (L_{RBs} - 1) \le \left[ N_{BWP}^{size} / 2 \right] \text{ then} \qquad \text{EQUATION 1}$$

$$RIV = N_{BWP}^{size}(L_{RBs} - 1) + RB_{start}$$

else $$RIV = N_{BWP}^{size}\left( N_{BWP}^{size} - L_{RBs} + 1 \right) + \left( N_{BWP}^{size} - 1 - RB_{start} \right)$$

The disclosure relates in some aspects to configuring a UE with multiple active BWPs and communication operations relating thereto. Because of the slot format in full-duplex and because of the repetitive switching between HD and FD slots, it may be advantageous for a UE to use at least two active BWPs in the DL and/or at least two active BWPs in the UL. For example, having at least two active BWPs may reduce (e.g., minimize) the BWP switching time and give more flexibility for FD operation. A full-duplex UE may be configured with two (or potentially more) active BWPs in the DL and/or two (or potentially more) active BWPs in the UL. With two BWPs active at the same time, the network may schedule the DL and/or the UL over the two active BWPs at the same time.

Figure 8:
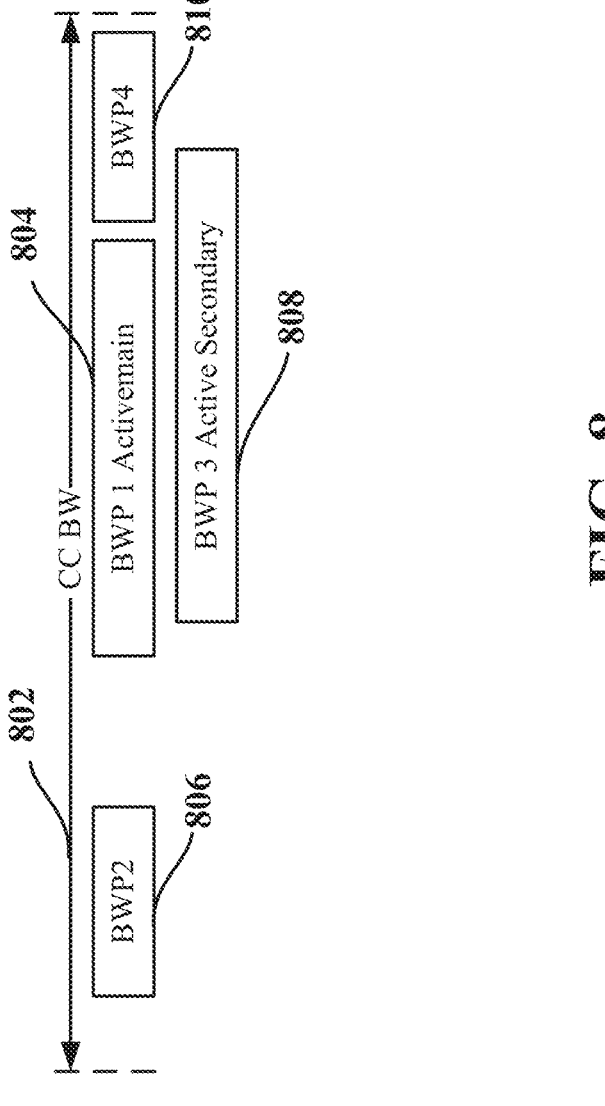
FIG. 8 is a conceptual illustration of an example of allocated bandwidth parts according to some aspects.

When an FD UE is configured with two active BWPs, one of the two active BWPs may be designated as the main active BWP and the other active BWP designated as a secondary active BWP. For example, as shown in FIG. 8, for an allocated bandwidth 802 within which a first BWP 804, a second BWP 806, a third BWP 808, and a fourth BWP 810 are defined, the first BWP 804 may be designated as the main active BWP and the third BWP 808 may be designated as the secondary active BWP.

The disclosure relates in some aspects to cross-BWP scheduling. Here, a UE may be configured to monitor PDCCH in one active BWP and operate in one or more active BWPs (e.g., receive PDSCH in one or two active BWPs based on scheduling carried by the PDCCH).

Figure 9:
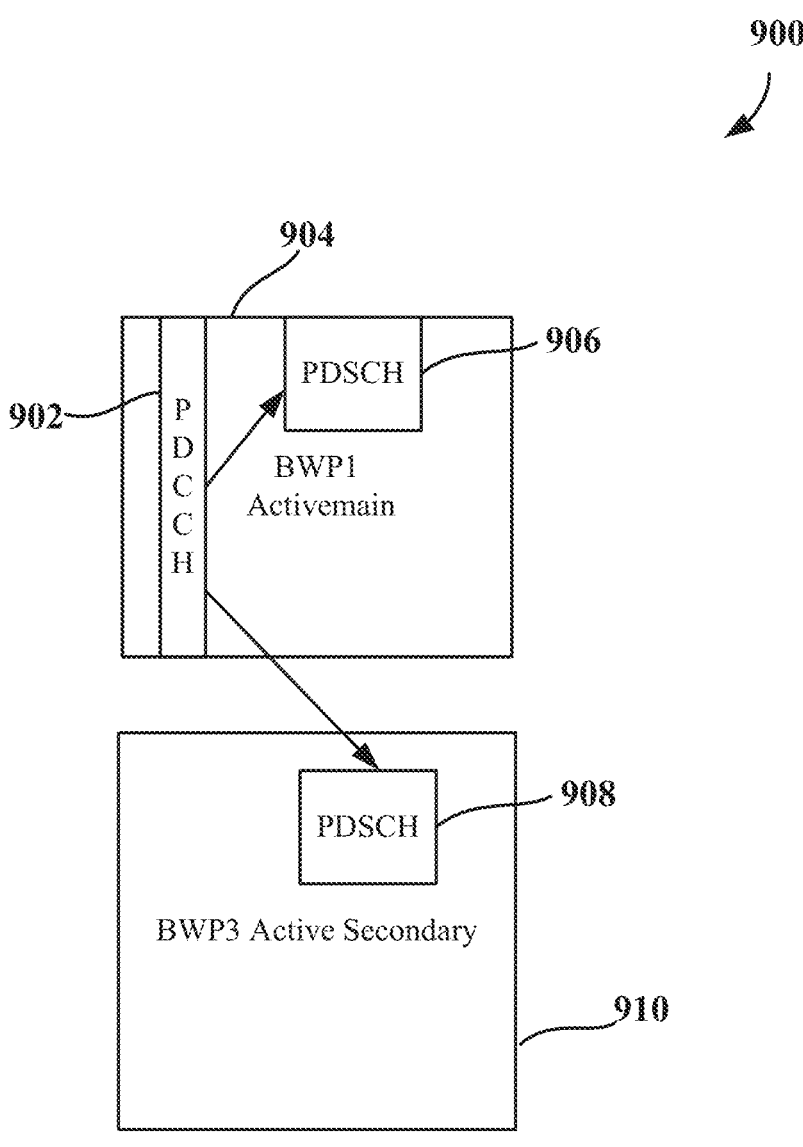
FIG. 9 is a conceptual illustration of an example of cross bandwidth part scheduling according to some aspects.

As shown in the cross-BWP scheduling 900 of FIG. 9, a PDCCH 902 carried by a first active BWP 904 (e.g., the main active BWP) may indicate that a PDSCH 906 is scheduled in the first active BWP 904 and/or that a PDSCH 908 is scheduled in a second active BWP 910 (e.g., the secondary active BWP). In some aspects, this may save power when monitoring PDCCH since the UE need not monitor both active BWPs. Advantageously, this scheduling may not be constrained by a time delay imposed by BWP switching since the BWP switching time is essentially zero.

As specific example, a PDCCH carrying DCI1_0 or DCI1_1 can schedule a PDSCH transmission over two active BWPs. The BWP indication in the DCI can take different forms in different scenarios.

In some examples, the DC indicates that the UE is to use the main active BWP. In this case, the UE may determine the cross-BWP allocation from the FDRA.

For example, for Type 0 FDRA, a bitmap of the form [1 1 0 0] may indicate that the PDSCH is scheduled in a single active BWP. Conversely, a bitmap of the form [1 1 0 0 0 1 1 0] may indicate that the PDSCH is scheduled in a two active BWPs.

For Type 1 FDRA, an Rbstart=1 and a length=4 RBs may indicate that the PDSCH is scheduled in a single active BWP. Conversely, an Rbstart=1 and a length=12 RBs, where the bandwidth of the first active BWP is less than 12 RBs, may indicate that the PDSCH is scheduled in two active BWPs. Stated another way, if the frequency allocation in the FDRA is greater than the bandwidth of the main active BWP, the UE may determine that the PDSCH is in the secondary active BWP as well. Conversely, if the frequency allocation in the FDRA is less than or equal to the bandwidth of the main active BWP, the UE may determine that the PDSCH is only in the main active BWP.

In some examples, the DCI indicates that the UE is to use a particular active BWP (e.g., the main active BWP) and the DCI also includes an indication (e.g., a bit) that specifies whether there is cross-BWP scheduling. For example, one value (e.g., zero) for the indication may mean that the scheduled PDSCH is contained in the indicated active BWP. Conversely, another value (e.g., one) for the indication may mean that the scheduled PDSCH spans two active BWPs.

The disclosure relates in some aspects to TDRA signaling for cross-BWP scheduling. In some examples, the same TDRA is used for the PDSCH in both active BWPs. In some examples, different TDRAs may be used for the PDSCHs in the two active BWPs. A base station may configure a UE to expect one or the other of these options. Also, UE capability information may indicate whether a UE supports one or both of these options. Several different approaches may be used for the scenario where different TDRAs are used for different active BWPs.

In some examples, the base station sends two independent TDRAs to the UE to apply to the different active BWPs. For example, a DCI may include a first TDRA for a first active BWP and a second TDRA for a second active BWP.

In some examples, the base station sends one TDRA for a first active BWP and an index offset to the UE. The UE uses the index offset to derive the TDRA for a second active BWP. In some examples, this index offset is an offset to the TDRA index of the signaled TDRA. Thus, the UE may add the index offset to the TDRA index to determine the TDRA index of the TDRA for the second active BWP. The index offset may be signaled via a DCI, via RRC signaling, or via some other type of signaling.

In some examples, the base station sends one TDRA for a first active BWP and a time offset to the UE. The UE uses the time offset to derive the TDRA for a second active BWP. In some examples, the time offset indicates a number of symbols. Thus, the UE may add the time offset to the symbol location of the signaled TDRA to determine the symbol location of the TDRA for the second active BWP. The time offset may be signaled via a DCI, via RRC signaling, or via some other type of signaling.

The disclosure relates in some aspects to FDRA signaling for cross-BWP scheduling. In some examples, the same FDRA is used for the PDSCH in both active BWPs. In some examples, different FDRAs may be used for the PDSCH in the two active BWPs. For example, the base station may indicate a different bitmap (Type 0 FDRA) or SLIV (Type 1 FDRA) for each active BWP. A base station may configure a UE to expect one or the other of these options. Also, UE capability information (e.g., transmitted by a UE) may indicate whether the UE supports one or both of these options.

In some examples, the same Type 0 FDRA is specified for both active BWPs. In some examples, the RBG size may depend on the active BWP bandwidth. Consequently, different RBG sizes can be specified for each active BWP. Also, the bitmap size can be 18 for one active BWP and 9 for the other active BWP in some examples.

For this Type 0 FDRA scenario, the UE is signaled with a bitmap for the FDRA covering the active BWPs. Since the active BWPs might have different bandwidths, the active BWPs may have different RBG sizes.

Under this assumption, in some examples, if 9 bits are assigned for each active BWP, the UE will receive a total of 18 bits. This may be supported by conventional UEs. If, on the other hand, 18 bits are assigned for one active BWP, the UE may receive 27 to 36 bits, which may be a relatively large overload.

In some examples, the UE adds the bandwidth of each active BWP to determine the RBG size. Consequently, the UE can calculate the total number of bits needed to signal the FDRA whether the number of bits is 9 in total or 18 in total.

In some examples, the same Type 1 FDRA is specified for both active BWPs. In this case, the base station may signal one Type 1 FDRA (e.g., SLIV). In this case, a UE may assume there is a combined active BWP (e.g., by combining the active BWPs) where the SLIV indicates a start and length indication for this combined BWP. The UE may then drop any frequency allocation that does not lie in either active BWP.

Figure 10:
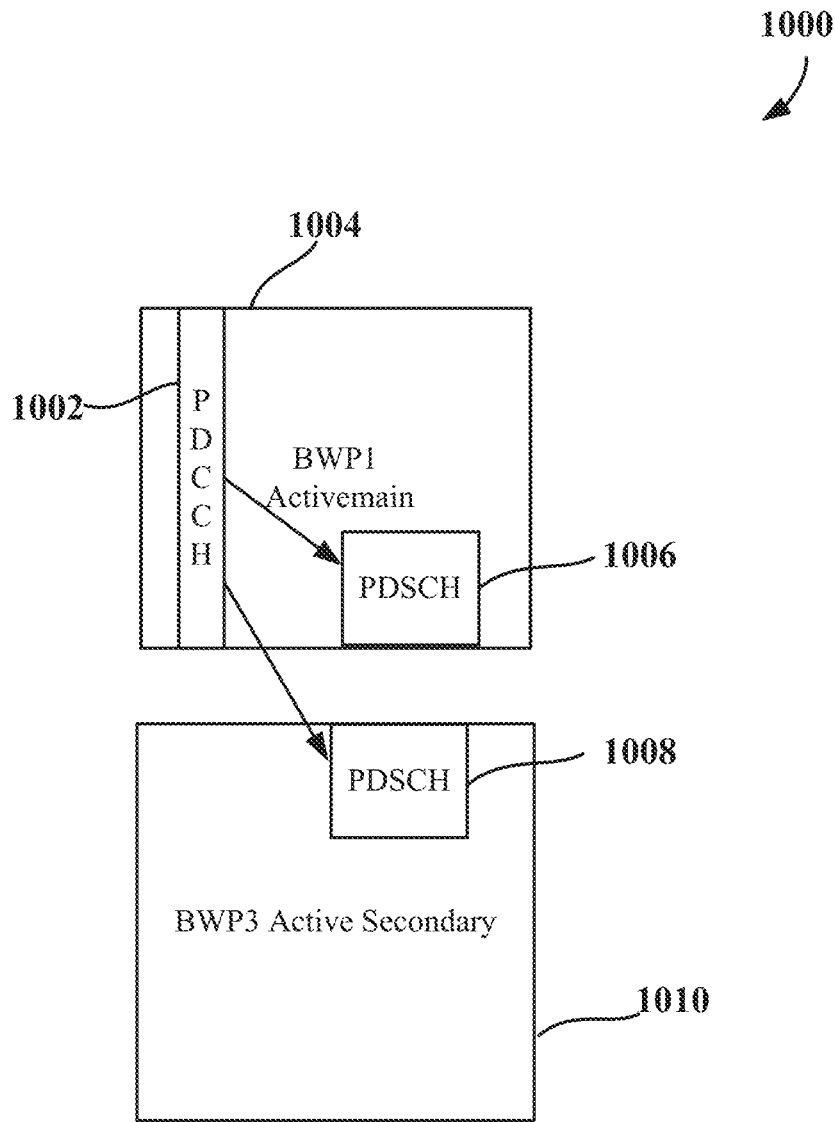
FIG. 10 is a conceptual illustration of another example of cross bandwidth part scheduling according to some aspects.

Referring to the cross-BWP scheduling 1000 of FIG. 10, a PDCCH 1002 carried by a first active BWP 1004 (e.g., the main active BWP) may indicate that a PDSCH 1006 is scheduled in the first active BWP 1004 and/or that a PDSCH 1008 is scheduled in a second active BWP 1010 (e.g., the secondary active BWP). In this example, a combined BWP may span the allocation for the PDSCH 1008 and the allocation for the PDSCH 1006, where the UE drops the frequency band between these two allocations.

If the start plus the length (e.g. SLIV) exceeds the limit of the higher frequency active BWP, the UE may apply cyclic allocation in the lower frequency active BWP. In the example of FIG. 9, the first active BWP 904 is in a higher frequency band than the second active BWP 910. Assuming the SLIV start is at the bottom of the PDSCH 906, the length calculation may start there, continuing upward until the upper boundary of the first active BWP 904 is reached, then wrapping back down to the lower boundary of the second active BWP 910 up to the PDSCH 908.

FIG. 1 illustrates an example of signaling 1100 in a wireless communication network including a BS 1102 and a UE 1104. In some examples, the UE 1104 may correspond to any of the UEs or scheduled entities shown in any one or more of FIGS. 1, 2, 4A, 4B, 4C, 7A, 7B, and 12. In some examples, the BS 1102 may correspond to one or more of the BSs or scheduling entities shown in any one or more of FIGS. 1, 2, 4A, 4B, 4C, 7A, 7B, and 14.

At 1106 of FIG. 11, the BS 1102 sends an indication of cross-BWP scheduling to the UE 1104. For example, the BS 1102 may send a DCI via a PDCCH in a first active BWP (e.g., the main active BWP). The DCI may indicate that a PDSCH is scheduled in a second active BWP (e.g., the secondary active BWP). The DCI may indicate that a PDSCH is scheduled in the first active BWP.

At 1108, the UE 1104 identifies an active BWP to use for a communication operation (e.g., monitoring). In some examples, the UE 1104 may monitor the main active BWP (e.g., the specified main active BWP or the active BWP with the lowest ID) for a PDCCH. Accordingly, the UE 1104 may receive a DCI sent by the BS 1102 at 1106.

At 1108, the UE 1104 identifies the active BWP allocations for the communication scheduled by the DCI. In some examples, the DCI may indicate whether the scheduling is cross-BWP scheduling. In some examples, the DCI may indicate at least one TDRA for the scheduled active BWP(s). In some examples, the DCI may indicate at least one FDRA for the scheduled active BWP(s).

At 1112, the UE 1104 and the BS 1102 may communicate via one or more of the active BWPs indicated by the DCI.

Figure 12:
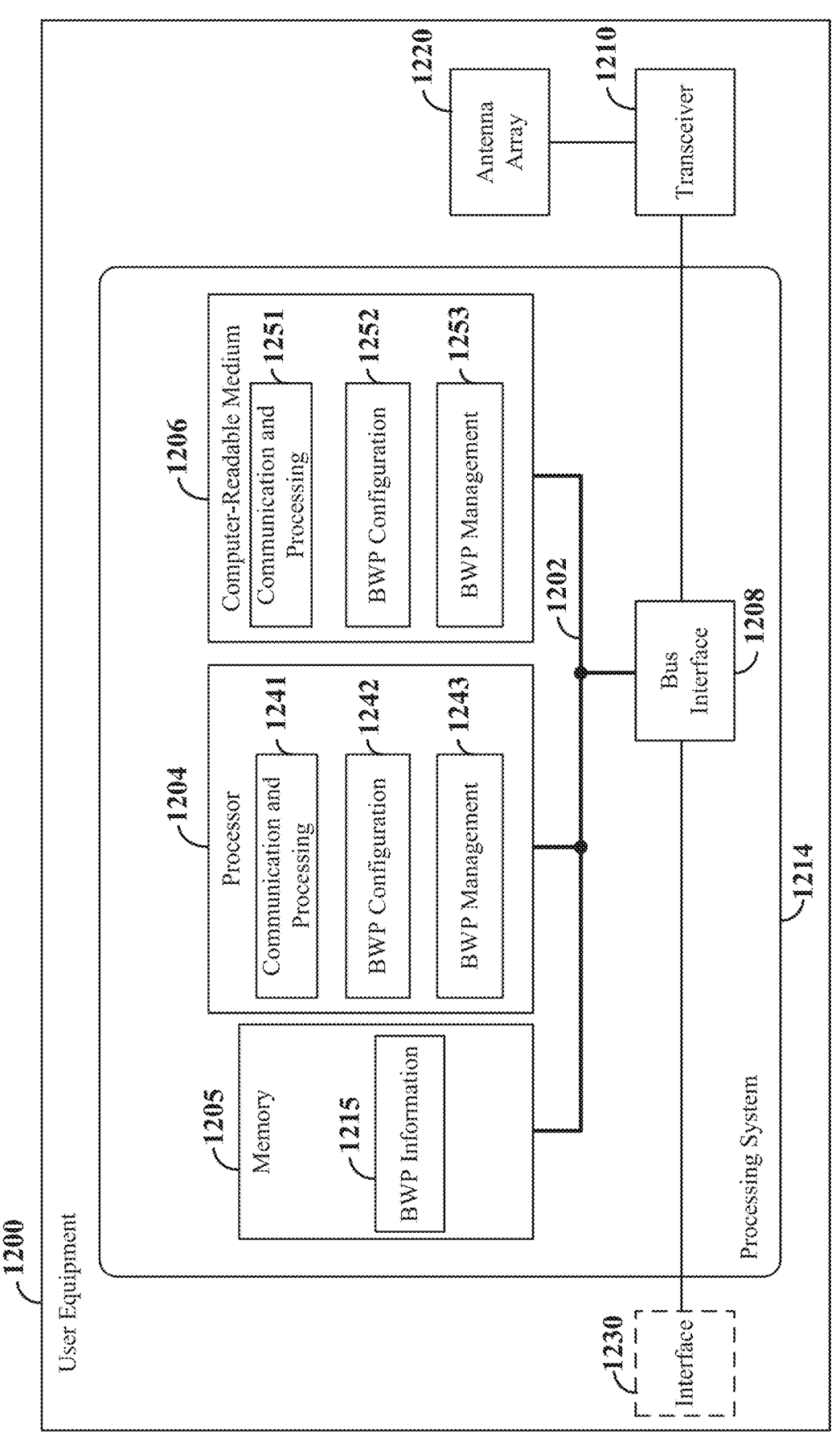
FIG. 12 is a block diagram illustrating an example of a hardware implementation for a user equipment employing a processing system according to some aspects.

FIG. 12 is a block diagram illustrating an example of a hardware implementation for a UE 1200 employing a processing system 1214. For example, the UE 1200 may be a user equipment (UE) or other device configured to wirelessly communicate with a base station, as discussed in any one or more of FIGS. 1-11. In some implementations, the UE 1200 may correspond to any of the UEs or scheduled entities shown in any one or more of FIGS. 1, 2, 4A, 4B, 4C, 7A, 7B, and 11.

In accordance with various aspects of the disclosure, an element, or any portion of an element, or any combination of elements may be implemented with the processing system 1214. The processing system 1214 may include one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes and procedures described herein.

The processor 1204 may in some instances be implemented via a baseband or modem chip and in other implementations, the processor 1204 may itself comprise a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and an antenna array 1220, and an interface between the bus

1202 and an interface 1230. The transceiver 1210 provides a communication interface or means for communicating with various other apparatus over a wireless transmission medium. The interface 1230 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1230 may include a user interface (e.g., keypad, display, speaker, microphone, joystick). Of course, such a user interface is optional, and may be omitted in some examples, such as an IoT device.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store BWP information 1215 used by the processor 1204 for communication operations as described herein.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1200 may be configured to perform any one or more of the operations described herein (e.g., as described above in conjunction with FIGS. 1-11 and as described below in conjunction with FIG. 13). In some aspects of the disclosure, the processor 1204, as utilized in the UE 1200, may include circuitry configured for various functions.

The processor 1204 may include communication and processing circuitry 1241. The communication and processing circuitry 1241 may be configured to communicate with a base station, such as a gNB. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains, each configured to process signals in a different RAT (or RAN) type. The communication and processing circuitry 1241 may further be configured to execute communication and processing software 1251 included on the computer-readable medium 1206 to implement one or more functions described herein.

In some examples, the communication and processing circuitry 1241 may be configured to receive and process downlink beamformed signals at a mmWave frequency or a sub-6 GHz frequency via the transceiver 1210 and an antenna array 1220. For example, the communication and processing circuitry 1241 may be configured to receive a respective reference signal (e.g., SSB or CSI-RS) on each of a plurality of downlink beams from the base station during a downlink beam sweep via at least one first antenna panel of the antenna array 1220. The communication and processing circuitry 1241 may further be configured to transmit a beam measurement report to the base station.

In some examples, the communication and processing circuitry 1241 may further be configured to generate and transmit uplink beamformed signals at a mmWave frequency or a sub-6 GHz frequency via the transceiver 1210 and the antenna array 1220. For example, the communication and processing circuitry 1241 may be configured to transmit a respective reference signal (e.g., SRS or DMRS) on each of a plurality of uplink beams to the base station during an uplink beam sweep via at least one second antenna panel of the antenna array 1220.

The communication and processing circuitry 1241 may further be configured to generate and transmit a request to the base station. For example, the request may be included in a MAC-CE carried in a PUSCH. UCI in a PUCCH or PUSCH, a random access message, or an RRC message. The communication and processing circuitry 1241 may further be configured to generate and transmit a scheduling request (e.g., via UCI in a PUCCH) to the base station to receive an uplink grant for the PUSCH carrying the MAC-CE including the request.

The communication and processing circuitry 1241 may further be configured to generate and transmit an uplink signal on one or more uplink transmit beams applied to the uplink signal. The uplink signal may include, for example, a PUCCH. PUSCH, SRS, DMRS, or PRACH.

The communication and processing circuitry 1241 may further be configured to control the antenna array 1220 and the transceiver 1210 to search for and identify a plurality of downlink transmit beams during a downlink beam sweep. The communication and processing circuitry 1241 may further be configured to obtain a plurality of beam measurements on each of a plurality of downlink receive beams via the antenna array 1220 for each of the identified downlink transmit beams. The communication and processing circuitry 1241 may further be configured to generate a beam measurement report for transmission to the base station using the communication and processing circuitry 1241.

The communication and processing circuitry 1241 may further be configured to identify one or more selected uplink beam(s) based on the beam measurements obtained from the downlink beam reference signals. In some examples, the communication and processing circuitry 1241 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1241 may be configured to generate one or more uplink transmit beams for transmission in an uplink beam sweep. Each uplink transmit beam may carry an uplink reference signal (e.g., an SRS) for measurement by the base station. The communication and processing circuitry 1241 may further be configured to identify the selected uplink transmit beam(s) selected by the base station based on the uplink beam measurements. For example, the communication and processing circuitry 1241 may be configured to receive an indication of the selected uplink transmit beam(s) from the base station.

In still further aspects, it is noted that the antenna array(s) 1230 may be configured by the processor 1204 (and the memory 1205 or the computer-readable medium 1206) to implement a first antenna panel and a second antenna panel. Additionally, the processor 1204 (and the memory 1205 or the computer-readable medium 1206) may be configured to use the first antenna panel to transmit a first beam (e.g., an UL transmitting beam for FD communication) and the second antenna panel to receive a second beam (e.g., a DL receiving beam for FD communication). The second antenna panel may be used by the processor 1204 to measure self-interference of the UE for FD communication.

In some implementations where the communication involves receiving information, the communication and processing circuitry 1241 may obtain information from a component of the UE 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., means for transmitting). In some examples, the communication and processing circuitry 1241 may include functionality for a means for encoding.

The processor 1204 may include BWP configuration circuitry 1242 configured to perform BWP configuration-related operations as discussed herein. The BWP configuration circuitry 1242 may be configured to execute BWP configuration software 1252 included on the computer-readable medium 1206 to implement one or more functions described herein.

The BWP configuration circuitry 1242 may include functionality for a means for receiving BWP configuration information. For example, the BWP configuration circuitry 1242 may be configured to receive and process a BWP configuration.

The processor 1204 may include BWP management circuitry 1243 configured to perform BWP management-related operations as discussed herein. The BWP management circuitry 1243 may be configured to execute BWP management software 1253 included on the computer-readable medium 1206 to implement one or more functions described herein.

The BWP management circuitry 1243 may include functionality for a means for receiving a DCI. For example, the BWP management circuitry 1243 may be configured to receive a PDCCH via an active BWP (e.g., the main active BWP) and extract a DCI carried by the PDCCH. The BWP management circuitry 1243 may be configured to identify an active BWP.

The BWP management circuitry 1243 may include functionality for a means for identifying a resource. For example, the BWP management circuitry 1243 may be configured to parse a DCI to identify a resource in at least one active BWP.

The BWP management circuitry 1243 may include functionality for a means for receiving information via a resource. For example, the BWP management circuitry 1243 may be configured to receive a PDSCH via one active BWP or multiple active BWPs.

FIG. 13 is a flow chart illustrating an example wireless communication method 1300 in accordance with some aspects of the disclosure. As described below, some or all illustrated features may be omitted in a particular implementation within the scope of the present disclosure, and some illustrated features may not be required for implementation of all examples. In some examples, the wireless communication method 1300 may be carried out by the UE 1200 illustrated in FIG. 12. In some examples, the wireless communication method 1300 may be carried out by any suitable apparatus or means for carrying out the functions or algorithm described below.

At block 1302, a UE may receive bandwidth part (BWP) configuration information from a base station, the BWP configuration information specifying a first active BWP for the UE and a second active BWP for the UE. For example, the BWP configuration circuitry 1242 together with the communication and processing circuitry 1241 and the transceiver 1210, shown and described above in connection with FIG. 12, may provide a means to receive bandwidth part (BWP) configuration information from a base station.

In some examples, an active BWP specified for the UE may also be specified for at least one other UE. In some examples, the BWP configuration information may specify at least one third active BWP for the UE.

At block 1304, the UE may receive downlink control information (DCI) from the base station, wherein the DCI indicates at least one resource in the first active BWP, in the second active BWP, or in the first active BWP and the second active BWP. For example, the BWP management circuitry 1243 together with the communication and processing circuitry 1241 and the transceiver 1210, shown and described above in connection with FIG. 12, may provide a means to receive downlink control information (DCI) from the base station.

At block 1306, the UE may identify from the DCI at least one resource in the first active BWP, in the second active BWP, or in the first active BWP and the second active BWP. For example, the BWP management circuitry 1243, shown and described above in connection with FIG. 12, may provide a means to identify from the DCI at least one resource in the first active BWP, in the second active BWP, or in the first active BWP and the second active BWP.

In some examples, the DCI indicates that the first active BWP is a main active BWP. In some examples, the UE may determine whether the at least one resource includes a first resource in the second active BWP.

In some examples, the DCI indicates a frequency domain resource allocation (FDRA). In some examples, determining whether the at least one resource includes a first resource in the second active BWP may include determining whether a first bandwidth specified by the FDRA is greater than a second bandwidth of the first active BWP.

In some examples, the DCI may further include a cross-BWP scheduling indication. In some examples, determining whether the at least one resource includes a first resource in the second active BWP is based on the indication. In some examples, the indication set to a first value specifies that the first active BWP carries a scheduled physical downlink shared channel (PDSCH), and the indication set to a second value specifies that the first active BWP and the second active BWP collectively carry the scheduled PDSCH.

In some examples, the DCI indicates a time domain resource allocation (TDRA) for the first active BWP and the second active BWP. In some examples, the DCI indicates a first time domain resource allocation (TDRA) for the first active BWP, and a second TDRA for the second active BWP.

In some examples, the DCI indicates a first time domain resource allocation (TDRA) for the first active BWP, and an index offset. In some examples, the UE may identify a second TDRA for the second active BWP based on the index offset and a TDRA index for the first TDRA.

In some examples, the DCI indicates a first time domain resource allocation (TDRA) for the first active BWP, and a time offset. In some examples, the UE may identify a second TDRA for the second active BWP based on the time offset and the first TDRA.

In some examples, the DCI indicates a first frequency domain resource allocation (FDRA) for the first active BWP, and a second FDRA for the second active BWP. In some examples, the first FDRA is a first type of FDRA, and the second FDRA is the first type of FDRA. In some examples, the first FDRA is a first type of FDRA, and the second FDRA is second type of FDRA that is different from the first type of FDRA. In some examples, the first FDRA is specified by a bitmap, and the second FDRA is specified by a start and length indicator value (SLIV).

In some examples, the DCI indicates a frequency domain resource allocation (FDRA) for the first active BWP and the second active BWP, and the FDRA is specified by a bitmap.

In some examples, a first set of bits of the bitmap is assigned to the first active BWP, and a second set of bits of the bitmap is assigned to the second active BWP. In some examples, the first set of bits is nine bits and the second set of bits is nine bits, the first set of bits is nine bits and the second set of bits is eighteen bits, or the first set of bits is eighteen bits and the second set of bits is eighteen bits. In some examples, the UE may determine a resource block group (RBG) size based on a sum of a first bandwidth of the first active BWP and a second bandwidth of the second active BWP, and calculating a quantity of bits for the bitmap based on the RBG size. In some examples, determining the RBG size is further based on a configuration option for the FDRA. In some examples, the method may further include selecting the configuration option based on a configuration of a main active BWP.

In some examples, the DCI indicates a frequency domain resource allocation (FDRA) for the first active BWP and the second active BWP, and the FDRA is specified by a start and length indicator value (SLIV). In some examples, the SLIV indicates a start of a frequency allocation that includes the first active BWP and the second active BWP, and a length of the frequency allocation that includes the first active BWP and the second active BWP. In some examples, the UE may determine that the start plus the length exceeds a boundary of the first active BWP, wherein the first active BWP is in a higher frequency band than the second active BWP, and apply cyclic allocation in the second active BWP after determining that the start plus the length exceeds the boundary of the first active BWP At block 1308, the UE may receive information from the base station via the at least one resource. For example, the BWP management circuitry 1243 together with the communication and processing circuitry 1241 and the transceiver 1210, shown and described above in connection with FIG. 12, may provide a means to receive information from the base station via the at least one resource.

In some examples, the UE may receive a PDSCH via a resource in the first active BWP. In some examples, the UE may receive a PDSCH via a resource in the second active BWP. In some examples, the UE may receive a PDSCH via a first resource in the first active BWP and a second resource in the second active BWP.

Figure 14:
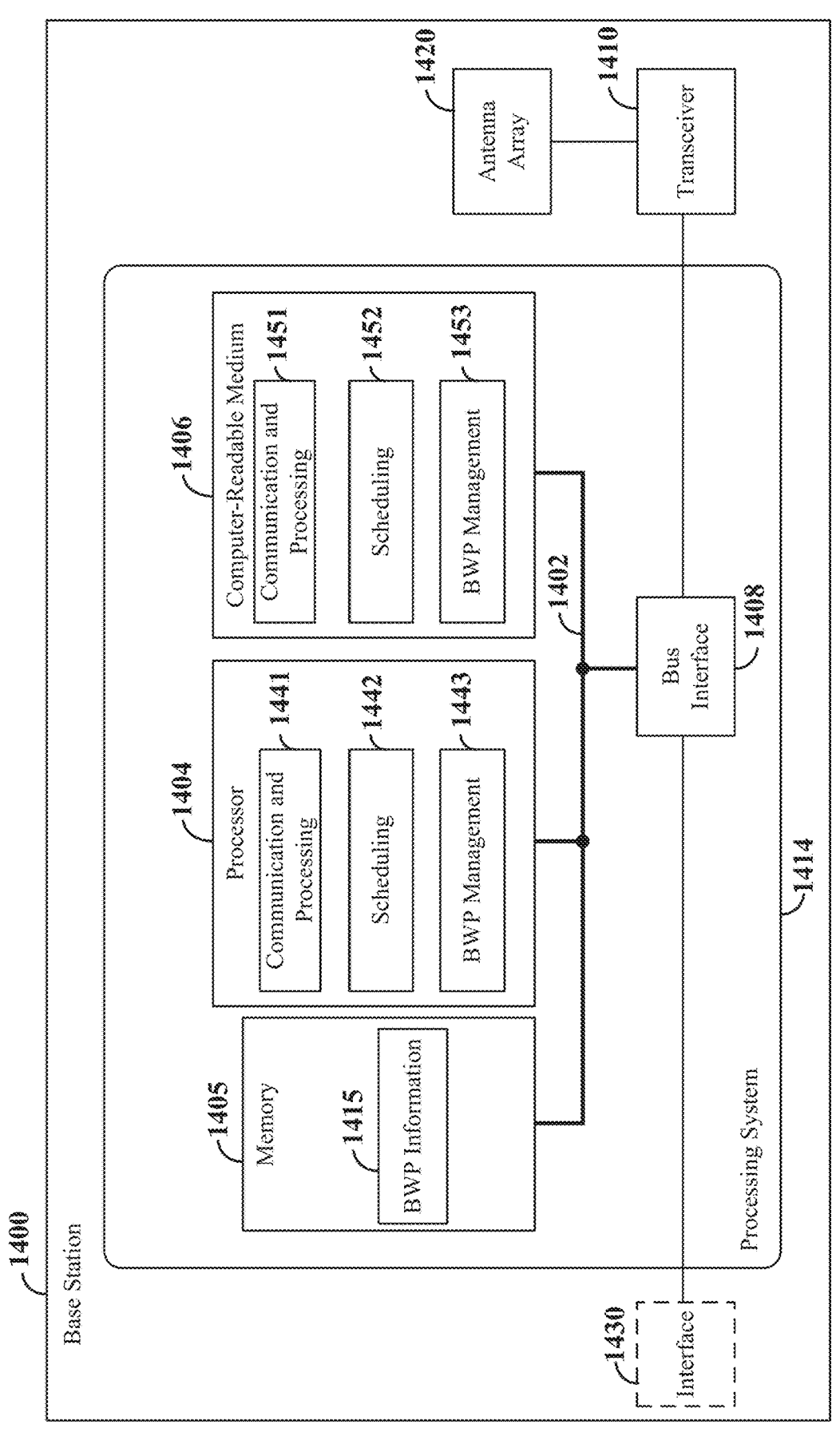
FIG. 14 is a block diagram illustrating an example of a hardware implementation for a base station employing a processing system according to some aspects.

FIG. 14 is a conceptual diagram illustrating an example of a hardware implementation for base station (BS) 1400 employing a processing system 1414. In some implementations, the BS 1400 may correspond to any of the BSs (e.g., gNBs,) or scheduling entities shown in any one or more of FIGS. 1, 2, 4A, 4B, 4C, 7A, 7B, and 11.

In accordance with various aspects of the disclosure, an element, or any portion of an element, or any combination of elements may be implemented with the processing system 1414. The processing system may include one or more processors 1404. The processing system 1414 may be substantially the same as the processing system 1214 illustrated in FIG. 12, including a bus interface 1408, a bus 1402, a memory 1405, a processor 1404, and a computer-readable medium 1406. For example, the memory 1405 may store BWP information 1415 used by the processor 1404 for communication operations as described herein. Furthermore, the BS 1400 may include an interface 1430 (e.g., a network interface) that provides a means for communicating with at least one other apparatus within a core network and with at least one radio access network.

The BS 1400 may be configured to perform any one or more of the operations described herein (e.g., as described above in conjunction with FIGS. 1-11 and as described below in conjunction with FIG. 15). In some aspects of the disclosure, the processor 1404, as utilized in the BS 1400, may include circuitry configured for various functions.

The processor 1404 may be configured to generate, schedule, and modify a resource assignment or grant of time-frequency resources (e.g., a set of one or more resource elements). For example, the processor 1404 may schedule time-frequency resources within a plurality of time division duplex (TDD) and/or frequency division duplex (FDD) subframes, slots, and/or mini-slots to carry user data traffic and/or control information to and/or from multiple UEs.

The processor 1404 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources. The processor 1404 may further be configured to schedule resources for the uplink transmission of uplink reference signals (e.g., SRSs) on a plurality of uplink beams for an uplink beam sweep in accordance with a selected beam sweep type and selected number of uplink reference signal resources. The processor 1404 may further be configured to schedule resources that may be utilized by the UE. For example, the resources may include resources scheduled for transmission of a PUCCH, PUSCH, PRACH occasion or RRC message. In some examples, the processor 1404 may be configured to schedule PUSCH resources in response to receiving a scheduling request from the UE.

The processor 1404 may further be configured to schedule resources for the transmission of an uplink signal. In some examples, the resources may be associated with one or more uplink transmit beams and one or more corresponding receive beams applied to the uplink signal (e.g., based on the uplink BPLs).

In some aspects of the disclosure, the processor 1404 may include communication and processing circuitry 1441. The communication and processing circuitry 1444 may be configured to communicate with a UE. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein.

In some examples, the communication and processing circuitry 1441 may be configured to receive and process uplink beamformed signals at a mmWave frequency or a sub-6 GHz frequency via a transceiver 1410 and an antenna array 1420. For example, the communication and processing circuitry 1441 may be configured to receive a respective reference signal (e.g., SRS or DMRS) on each of a plurality of uplink beams from the UE during an uplink beam sweep.

In some examples, the communication and processing circuitry 1441 may further be configured to generate and transmit downlink beamformed signals at a mmWave frequency or a sub-6 GHz frequency via the transceiver 1410 and the antenna array 1420. For example, the communication and processing circuitry 1441 may be configured to transmit a respective downlink reference signal (e.g., SSB or CSI-RS) on each of a plurality of downlink beams to the UE during a downlink beam sweep via at least one first antenna panel of the antenna array 1420. The communication and processing circuitry 1441 may further be configured to receive a beam measurement report from the UE.

The communication and processing circuitry 1441 may further be configured to receive a request from the UE. For example, the request may be included in a MAC-CE carried in a PUSCH, UCI in a PUCCH or PUSCH, a random access message, or an RRC message. The communication and processing circuitry 1441 may further be configured to receive a scheduling request (e.g., via UCI in a PUCCH) from the UE for an uplink grant for the PUSCH carrying the MAC-CE including the request.

The communication and processing circuitry 1441 may further be configured to receive an uplink signal on one or more uplink receive beams via one or more uplink transmit beams applied to the uplink signal. For example, the communication and processing circuitry 1441 may be configured to receive the uplink signal on one or more uplink receive beams via at least one second antenna panel of the antenna array 1420. The uplink signal may include, for example, a PUCCH, PUSCH, SRS, DMRS, or PRACH.

The communication and processing circuitry 1441 may further be configured to control the antenna array 1420 and transceiver 1410 to generate a plurality of downlink transmit beams during a downlink beam sweep. The communication and processing circuitry 1441 may further be configured to receive a beam measurement report from the UE using the communication and processing circuitry 1444. The communication and processing circuitry 1441 may further be configured to identify one or more selected uplink beam(s) based on the beam measurements. In some examples, the communication and processing circuitry 1441 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1441 may be configured to receive one or more uplink transmit beams in an uplink beam sweep. Each uplink transmit beam may carry an uplink reference signal (e.g., an SRS) for measurement by the communication and processing circuitry 1441. The communication and processing circuitry 1441 may further be configured to obtain a plurality of beam measurements on each of a plurality of uplink receive beams of the antenna array 1420 for each of the uplink transmit beams. The communication and processing circuitry 1441 may further be configured to select the selected uplink transmit beam(s) and corresponding uplink receive beams forming respective uplink BPLs based on the uplink beam measurements.

In still further aspects, it is noted that the antenna array(s) 1430 may be configured by the processor 1404 (and the memory 1405 or the computer-readable medium 1406) to implement a first antenna panel and a second antenna panel. Additionally, the processor 1404 and the memory 1405 or the computer-readable medium 1406) may be configured to use the first antenna panel to transmit a first beam (e.g., a DL transmitting beam for FD communication) and the second antenna panel to receive a second beam (e.g., an UL receiving beam for FD communication). The second antenna panel may be used by the processor 1404 to measure self-interference of the BS 1400 for FD communication.

In some implementations where the communication involves receiving information, the communication and processing circuitry 1441 may obtain information from a component of the BS 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., means for transmitting).

The processor 1404 may include scheduling circuitry 1442 configured to perform scheduling-related operations as discussed herein (e.g., communicating scheduling of a time slot for a user). The scheduling circuitry 1442 may be configured to execute scheduling software 1452 included on the computer-readable medium 1406 to implement one or more functions described herein.

The scheduling circuitry 1442 may include functionality for a means for generating a DCI. For example, the scheduling circuitry 1442 may be configured to generate a DCI including scheduling information for a UE.

The scheduling circuitry 1442 may include functionality for a means for transmitting a DCI. For example, the scheduling circuitry 1442 may be configured to transmit the DCI via a PDCCH in an active BWP (e.g., the main active BWP).

The processor 1404 may include BWP management circuitry 1443 configured to perform BWP management-related operations as discussed herein. The BWP management circuitry 1443 may be configured to execute BWP management software 1453 included on the computer-readable medium 1406 to implement one or more functions described herein.

The BWP management circuitry 1443 may include functionality for a means for generating BWP configuration information. For example, the BWP management circuitry 1443 may be configured to generate a BWP configuration (e.g., based on resource usage in the system and/or resource usage requirements of particular UEs).

The BWP management circuitry 1443 may include functionality for a means for transmitting a BWP configuration information. For example, the BWP management circuitry 1443 may be configured to unicast or broadcast the BWP configuration.

The BWP management circuitry 1443 may include functionality for a means for transmitting information via a resource. For example, the BWP management circuitry 1443 may be configured to transmit a PDSCH via the first active BWP and/or the second active BWP.

Figure 15:
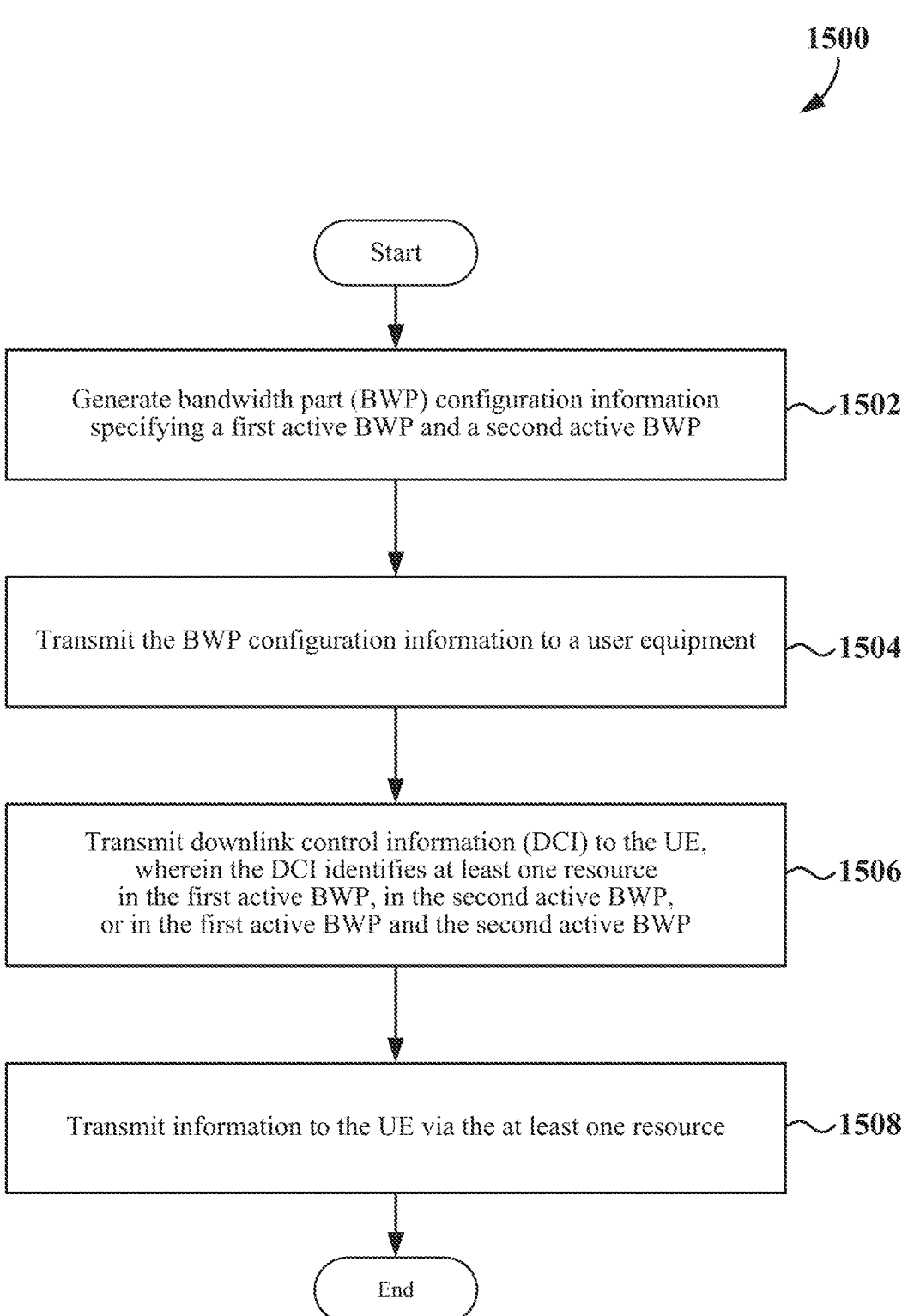
FIG. 15 is a flow chart of another example method for bandwidth part scheduling according to some aspects.

FIG. 15 is a flow chart illustrating an example wireless communication method 1500 *f* in accordance with some aspects of the disclosure. As described below, some or all illustrated features may be omitted in a particular implementation within the scope of the present disclosure, and some illustrated features may not be required for implementation of all examples. In some examples, the wireless communication method 1500 may be carried out by the BS 1400 illustrated in FIG. 14. In some examples, the wireless communication method 1500 may be carried out by any suitable apparatus or means for carrying out the functions or algorithm described below.

At block 1502, a BS may generate bandwidth part (BWP) configuration information specifying a first active BWP and a second active BWP. For example, the BWP management circuitry 1443, shown and described above in connection with FIG. 14, may provide a means to generate bandwidth part (BWP) configuration information specifying a first active BWP and a second active BWP.

In some examples, an active BWP specified for the UE may also be specified for at least one other UE. In some examples, the BWP configuration information may specify at least one third active BWP for the UE.

At block 1504, the BS may transmit the BWP configuration information to a user equipment (UE). For example, the BWP management circuitry 1443 together with the communication and processing circuitry 1441 and the transceiver 1410, shown and described above in connection with FIG. 14, may provide a means to transmit the BWP configuration information to a user equipment (UE).

At block 1506, the BS may transmit downlink control information (DCI) to the UE, wherein the DCI identifies at least one resource in the first active BWP, in the second active BWP, or in the first active BWP and the second active BWP. For example, the scheduling circuitry 1442 together with the communication and processing circuitry 1441 and the transceiver 1410, shown and described above in connection with FIG. 14, may provide a means to transmit downlink control information (DCI) to the UE.

In some examples, the DCI indicates that the first active BWP is a main active BWP. In some examples, the DCI indicates a frequency domain resource allocation (FDRA). In some examples, a first bandwidth specified by the FDRA is less than or equal to a second bandwidth of the first active BWP. In some examples, a first bandwidth specified by the FDRA is greater than a second bandwidth of the first active BWP.

In some examples, the DCI may further include a cross-BWP scheduling indication. In some examples, the indication set to a first value specifies that the first active BWP carries a scheduled physical downlink shared channel (PDSCH), and the indication set to a second value specifies that the first active BWP and the second active BWP collectively carry the scheduled PDSCH.

In some examples, the DCI indicates a time domain resource allocation (TDRA) for the first active BWP and the second active BWP. In some examples, the DCI indicates a first time domain resource allocation (TDRA) for the first active BWP, and a second TDRA for the second active BWP.

In some examples, the DCI indicates a first time domain resource allocation (TDRA) for the first active BWP, and an index offset for a second TDRA for the second active BWP. In some examples, the DCI indicates a first time domain resource allocation (TDRA) for the first active BWP, and a time offset for a second TDRA for the second active BWP.

In some examples, the DCI indicates a first frequency domain resource allocation (FDRA) for the first active BWP, and a second FDRA for the second active BWP. In some examples, the first FDRA is a first type of FDRA, and the second FDRA is the first type of FDRA. In some examples, the first FDRA is a first type of FDRA, and the second FDRA is second type of FDRA that is different from the first type of FDRA. In some examples, the first FDRA is specified by a bitmap, and the second FDRA is specified by a start and length indicator value (SLIV).

In some examples, the DCI indicates a frequency domain resource allocation (FDRA) for the first active BWP and the second active BWP, and the FDRA is specified by a bitmap. In some examples, a first set of bits of the bitmap is assigned to the first active BWP, and a second set of bits of the bitmap is assigned to the second active BWP. In some examples, the first set of bits is nine bits and the second set of bits is nine bits, the first set of bits is nine bits and the second set of bits is eighteen bits, or the first set of bits is eighteen bits and the second set of bits is eighteen bits. In some examples, the method may further include determining a resource block group (RBG) size based on a sum of a first bandwidth of the first active BWP and a second bandwidth of the second active BWP, and calculating a quantity of bits for the bitmap based on the RBG size.

In some examples, the DCI indicates a frequency domain resource allocation (FDRA) for the first active BWP and the second active BWP, and the FDRA is specified by a start and length indicator value (SLIV). In some examples, the SLIV indicates a start of a frequency allocation that includes the first active BWP and the second active BWP, and a length of the frequency allocation that includes the first active BWP and the second active BWP.

At block 1508, the BS may transmit information to the UE via the at least one resource. For example, the BWP management circuitry 1443 together with the communication and processing circuitry 1441 and the transceiver 1410, shown and described above in connection with FIG. 14, may provide a means to transmit information to the UE via the at least one resource.

In some examples, the BS may transmit a PDSCH via a resource in the first active BWP. In some examples, the BS may transmit a PDSCH via a resource in the second active BWP. In some examples, the BS may transmit a PDSCH via a first resource in the first active BWP and a second resource in the second active BWP.

The following provides an overview of several aspects of the present disclosure.

Aspect 1: A method for wireless communication at a user equipment, the method comprising: receiving bandwidth part configuration information from a base station, the bandwidth part configuration information specifying a first active bandwidth part for the user equipment and a second active bandwidth part for the user equipment; receiving downlink control information from the base station; identifying from the downlink control information at least one resource in the first active bandwidth part, in the second active bandwidth part, or in the first active bandwidth part and the second active bandwidth part; and receiving information from the base station via the at least one resource.

Aspect 2: The method of aspect 1, wherein: the downlink control information indicates that the first active bandwidth part is a main active bandwidth part; and the method further comprises determining whether the at least one resource includes a first resource in the second active bandwidth part.

Aspect 3: The method of aspect 2, wherein: the downlink control information further indicates a frequency domain resource allocation; and the determining whether the at least one resource includes the first resource in the second active BWP comprises determining whether a first bandwidth specified by the frequency domain resource allocation is greater than a second bandwidth of the first active bandwidth part.

Aspect 4: The method of aspect 2, wherein: the downlink control information further comprises a cross-bandwidth part scheduling indication; and the determining whether the at least one resource includes the first resource in the second active bandwidth part is based on the indication.

Aspect 5: The method of aspect 4, wherein: the indication set to a first value specifies that the first active bandwidth part carries a scheduled physical downlink shared channel; and the indication set to a second value specifies that the first active bandwidth part and the second active bandwidth part collectively carry the scheduled physical downlink shared channel.

Aspect 6: The method of any of aspects 1 through 5, wherein the downlink control information indicates a time domain resource allocation for the first active bandwidth part and the second active bandwidth part.

Aspect 7: The method of any of aspects 1 through 6, wherein the downlink control information indicates: a first time domain resource allocation for the first active bandwidth part; and a second time domain resource allocation for the second active bandwidth part.

Aspect 8: The method of any of aspects 1 through 7, wherein the downlink control information indicates: a first time domain resource allocation for the first active bandwidth part; and an index offset.

Aspect 9: The method of aspect 8, further comprising: identifying a second time domain resource allocation for the second active bandwidth part based on the index offset and a time domain resource allocation index for the first time domain resource allocation.

Aspect 10: The method of any of aspects 1 through 9, wherein the downlink control information indicates: a first time domain resource allocation for the first active bandwidth part; and a time offset.

Aspect 11: The method of aspect 10, further comprising: identifying a second time domain resource allocation for the second active bandwidth part based on the time offset and the first time domain resource allocation.

Aspect 12: The method of any of aspects 1 through 11, wherein the downlink control information indicates: a first frequency domain resource allocation for the first active bandwidth part; and a second frequency domain resource allocation for the second active bandwidth part.

Aspect 13: The method of aspect 12, wherein: the first frequency domain resource allocation is a first type of frequency domain resource allocation; and the second frequency domain resource allocation is the first type of frequency domain resource allocation.

Aspect 14: The method of aspect 12, wherein: the first frequency domain resource allocation is a first type of frequency domain resource allocation; and the second frequency domain resource allocation is second type of frequency domain resource allocation that is different from the first type of frequency domain resource allocation.

Aspect 15: The method of aspect 12, wherein: the first frequency domain resource allocation is specified by a bitmap; and the second frequency domain resource allocation is specified by a start and length indicator value.

Aspect 16: The method of any of aspects 1 through 15, wherein: the downlink control information indicates a frequency domain resource allocation for the first active bandwidth part and the second active bandwidth part; and the frequency domain resource allocation is specified by a bitmap.

Aspect 17: The method of aspect 16, wherein: a first set of bits of the bitmap is assigned to the first active bandwidth part; and a second set of bits of the bitmap is assigned to the second active bandwidth part.

Aspect 18: The method of aspect 17, wherein: the first set of bits is nine bits and the second set of bits is nine bits; the first set of bits is nine bits and the second set of bits is eighteen bits; or the first set of bits is eighteen bits and the second set of bits is eighteen bits.

Aspect 19: The method of any of aspects 16 through 18, further comprising: determining a resource block group size based on a sum of a first bandwidth of the first active bandwidth part and a second bandwidth of the second active bandwidth part; and calculating a quantity of bits for the bitmap based on the resource block group size.

Aspect 20: The method of aspect 19, wherein the determining the resource block group size is further based on a configuration option for the frequency domain resource allocation.

Aspect 21: The method of aspect 20, further comprising: selecting the configuration option based on a configuration of a main active bandwidth part.

Aspect 22: The method of any of aspects 1 through 21, wherein: the downlink control information indicates a frequency domain resource allocation for the first active bandwidth part and the second active bandwidth part; and the frequency domain resource allocation is specified by a start and length indicator value.

Aspect 23: The method of aspect 22, wherein the start and length indicator value indicates: a start of a frequency allocation comprising the first active bandwidth part and the second active bandwidth part; and a length of the frequency allocation comprising the first active bandwidth part and the second active bandwidth part.

Aspect 24: The method of aspect 23, further comprising: determining that the start plus the length exceeds a boundary of the first active bandwidth part, wherein the first active bandwidth part is in a higher frequency band than the second active bandwidth part; and applying cyclic allocation in the second active bandwidth part after determining that the start plus the length exceeds the boundary of the first active bandwidth part.

Aspect 26: A method for wireless communication at a base station, the method comprising: generating bandwidth part configuration information specifying a first active bandwidth part and a second active bandwidth part; transmitting the bandwidth part configuration information to a user equipment; transmitting downlink control information to the user equipment, wherein the downlink control information identifies at least one resource in the first active bandwidth part, in the second active bandwidth part, or in the first active bandwidth part and the second active bandwidth part; and transmitting information to the user equipment via the at least one resource.

Aspect 27: The method of aspect 26, wherein: the downlink control information further indicates a frequency domain resource allocation; and a first bandwidth specified by the frequency domain resource allocation is less than or equal to a second bandwidth of the first active bandwidth part.

Aspect 28: The method of aspect 26, wherein: the downlink control information further indicates a frequency domain resource allocation; and a first bandwidth specified by the frequency domain resource allocation is greater than a second bandwidth of the first active bandwidth part.

Aspect 29: The method of any of aspects 26 through 28, wherein the downlink control information indicates: a first time domain resource allocation for the first active bandwidth part and an index offset for a second time domain resource allocation for the second active bandwidth part; or the first time domain resource allocation for the first active bandwidth part and a time offset for the second time domain resource allocation for the second active bandwidth part.

Aspect 30: A user equipment comprising: a transceiver configured to communicate with a radio access network, a memory, and a processor communicatively coupled to the transceiver and the memory, wherein the processor and the memory are configured to perform any one of aspects 1 through 24.

Aspect 31: An apparatus configured for wireless communication comprising at least one means for performing any one of aspects 1 through 24.

Aspect 32: A non-transitory computer-readable medium storing computer-executable code, comprising code for causing an apparatus to perform any one of aspects 1 through 24.

Aspect 33: A base station comprising: a transceiver, a memory, and a processor communicatively coupled to the transceiver and the memory, wherein the processor and the memory are configured to perform any one of aspects 26 through 29.

Aspect 34: An apparatus configured for wireless communication comprising at least one means for performing any one of aspects 26 through 29.

Aspect 35: A non-transitory computer-readable medium storing computer-executable code, comprising code for causing an apparatus to perform any one of aspects 26 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX). IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any one or more of FIG. 1, 2, 4A, 4B, 4C, 7A, 7B, 11, 12, or 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example. "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:
1. A user equipment, comprising:
a transceiver;

one or more memories that store processor-executable code; and one or more processors configured to execute the processor-executable code and cause the user equipment to:

receive bandwidth part configuration information from network entity via the transceiver, the bandwidth part configuration information specifying a first active bandwidth part for the user equipment and a second active bandwidth part for the user equipment;

receive downlink control information from the network entity via the transceiver, wherein the downlink control information indicates that the first active bandwidth part is a main active bandwidth part, and the downlink control information comprises a cross-bandwidth part scheduling indication;

identify, from the downlink control information, at least one resource in the first active bandwidth part and the second active bandwidth part;

determine, based on the indication, whether the at least one resource includes a first resource in the second active bandwidth part, wherein the indication set to a first value specifies that the first active bandwidth part carries a scheduled physical downlink shared channel, and the indication set to a second value specifies that the first active bandwidth part and the second active bandwidth part collectively carry the scheduled physical downlink shared channel; and receive, via the transceiver, information from the network entity via the at least one resource.

2. The user equipment of claim 1, wherein:

the downlink control information further indicates a frequency domain resource allocation; and the one or more processors further configured to execute the processor-executable code and cause the user equipment to determine whether a first bandwidth specified by the frequency domain resource allocation is greater than a second bandwidth of the first active bandwidth part.

3. The user equipment of claim 1, wherein the downlink control information indicates a time domain resource allocation for the first active bandwidth part and the second active bandwidth part.

4. The user equipment of claim 1, wherein the downlink control information indicates:

a first time domain resource allocation for the first active bandwidth part; and a second time domain resource allocation for the second active bandwidth part.

5. The user equipment of claim 1, wherein the downlink control information indicates:

a first time domain resource allocation for the first active bandwidth part; and an index offset.

6. The user equipment of claim 5, wherein the one or more processors further configured to execute the processor-executable code and cause the user equipment to:

identify a second time domain resource allocation for the second active bandwidth part based on the index offset and a time domain resource allocation index for the first time domain resource allocation.

7. The user equipment of claim 1, wherein the downlink control information indicates:

a first time domain resource allocation for the first active bandwidth part; and a time offset.

8. The user equipment of claim 7, wherein the one or more processors further configured to execute the processor-executable code and cause the user equipment to:

identify a second time domain resource allocation for the second active bandwidth part based on the time offset and the first time domain resource allocation.

9. The user equipment of claim 1, wherein the downlink control information indicates:

a first frequency domain resource allocation for the first active bandwidth part; and a second frequency domain resource allocation for the second active bandwidth part.

10. The user equipment of claim 9, wherein:

the first frequency domain resource allocation is a first type of frequency domain resource allocation; and the second frequency domain resource allocation is the first type of frequency domain resource allocation.

11. The user equipment of claim 9, wherein:

the first frequency domain resource allocation is a first type of frequency domain resource allocation; and the second frequency domain resource allocation is second type of frequency domain resource allocation that is different from the first type of frequency domain resource allocation.

12. The user equipment of claim 9, wherein:

the first frequency domain resource allocation is specified by a bitmap; and the second frequency domain resource allocation is specified by a start and length indicator value.

13. The user equipment of claim 1, wherein:

the downlink control information indicates a frequency domain resource allocation for the first active bandwidth part and the second active bandwidth part; and the frequency domain resource allocation is specified by a bitmap.

14. The user equipment of claim 13, wherein:

a first set of bits of the bitmap is assigned to the first active bandwidth part; and a second set of bits of the bitmap is assigned to the second active bandwidth part.

15. The user equipment of claim 14, wherein:

the first set of bits is nine bits and the second set of bits is nine bits;

the first set of bits is nine bits and the second set of bits is eighteen bits; or the first set of bits is eighteen bits and the second set of bits is eighteen bits.

16. The user equipment of claim 13, wherein the one or more processors further configured to execute the processor-executable code and cause the user equipment to:

determine a resource block group size based on a sum of a first bandwidth of the first active bandwidth part and a second bandwidth of the second active bandwidth part; and calculate a quantity of bits for the bitmap based on the resource block group size.

17. The user equipment of claim 16, wherein the one or more processors further configured to execute the processor-executable code and cause the user equipment to:

determine the resource block group size based on a configuration option for the frequency domain resource allocation.

18. The user equipment of claim 17, wherein the one or more processors further configured to execute the processor-executable code and cause the user equipment to:

select the configuration option based on a configuration of a-the main active bandwidth part.

19. The user equipment of claim 1, wherein:

the downlink control information indicates a frequency domain resource allocation for the first active bandwidth part and the second active bandwidth part; and the frequency domain resource allocation is specified by a start and length indicator value.

20. The user equipment of claim 19, wherein the start and length indicator value indicates:

a start of a frequency allocation comprising the first active bandwidth part and the second active bandwidth part; and a length of the frequency allocation comprising the first active bandwidth part and the second active bandwidth part.

21. The user equipment of claim 20, wherein the one or more processors further configured to execute the processor-executable code and cause the user equipment to:

determine that the start plus the length exceeds a boundary of the first active bandwidth part, wherein the first active bandwidth part is in a higher frequency band than the second active bandwidth part; and apply cyclic allocation in the second active bandwidth part after the determination that the start plus the length exceeds the boundary of the first active bandwidth part.

22. A method for wireless communication at a user equipment, the method comprising:

receiving bandwidth part configuration information from a network entity, the bandwidth part configuration information specifying a first active bandwidth part for the user equipment and a second active bandwidth part for the user equipment;

receiving downlink control information from the network entity, wherein the downlink control information indicates that the first active bandwidth part is a main active bandwidth part, and the downlink control information comprises a cross-bandwidth part scheduling indication;

identifying, from the downlink control information, at least one resource in the first active bandwidth part and the second active bandwidth part;

determining, based on the indication, whether the at least one resource includes a first resource in the second active bandwidth part, wherein the indication set to a first value specifies that the first active bandwidth part carries a scheduled physical downlink shared channel, and the indication set to a second value specifies that the first active bandwidth part and the second active bandwidth part collectively carry the scheduled physical downlink shared channel; and receiving information from the network entity via the at least one resource.

23. A network entity, comprising:

a transceiver;

one or more memories that store processor-executable code; and one or more processors configured to execute the processor-executable code and cause the network entity to:

generate bandwidth part configuration information specifying a first active bandwidth part and a second active bandwidth part;

transmit the bandwidth part configuration information to a user equipment via the transceiver;

transmit downlink control information to the user equipment via the transceiver, wherein the downlink control information identifies at least one resource in the first active bandwidth part and the second active bandwidth part, the downlink control information indicates that the first active bandwidth part is a main active bandwidth part, and the downlink control information comprises a cross-bandwidth part scheduling indication, wherein the indication set to a first value specifies that the first active bandwidth part carries a scheduled physical downlink shared channel, and the indication set to a second value specifies that the first active bandwidth part and the second active bandwidth part collectively carry the scheduled physical downlink shared channel; and transmit, via the transceiver, information to the user equipment via the at least one resource.

24. The network entity of claim 23, wherein:

the downlink control information further indicates a frequency domain resource allocation; and a first bandwidth specified by the frequency domain resource allocation is less than or equal to a second bandwidth of the first active bandwidth part.

25. The network entity of claim 23, wherein:

the downlink control information further indicates a frequency domain resource allocation; and a first bandwidth specified by the frequency domain resource allocation is greater than a second bandwidth of the first active bandwidth part.

26. The network entity of claim 23, wherein the downlink control information indicates:

a first time domain resource allocation for the first active bandwidth part and an index offset for a second time domain resource allocation for the second active bandwidth part; or the first time domain resource allocation for the first active bandwidth part and a time offset for the second time domain resource allocation for the second active bandwidth part.

27. A method for wireless communication at a network entity, the method comprising:

generating bandwidth part configuration information specifying a first active bandwidth part and a second active bandwidth part;

transmitting the bandwidth part configuration information to a user equipment;

transmitting downlink control information to the user equipment, wherein the downlink control information identifies at least one resource in the first active bandwidth part and the second active bandwidth part, the downlink control information indicates that the first active bandwidth part is a main active bandwidth part, and the downlink control information comprises a cross-bandwidth part scheduling indication, wherein the indication set to a first value specifies that the first active bandwidth part carries a scheduled physical downlink shared channel, and the indication set to a second value specifies that the first active bandwidth part and the second active bandwidth part collectively carry the scheduled physical downlink shared channel; and transmitting information to the user equipment via the at least one resource.

28. The method of claim 27, wherein:

the downlink control information further indicates a frequency domain resource allocation; and a first bandwidth specified by the frequency domain resource allocation is less than or equal to a second bandwidth of the first active bandwidth part.

29. The method of claim 27, wherein:

the downlink control information further indicates a frequency domain resource allocation; and a first bandwidth specified by the frequency domain resource allocation is greater than a second bandwidth of the first active bandwidth part.

30. The method of claim 27, wherein the downlink control information indicates:

a first time domain resource allocation for the first active bandwidth part and an index offset for a second time domain resource allocation for the second active bandwidth part; or the first time domain resource allocation for the first active bandwidth part and a time offset for the second time domain resource allocation for the second active bandwidth part.

\* \* \* \* \*